(12) United States Patent
Hong et al.

(10) Patent No.: US 10,524,189 B2
(45) Date of Patent: Dec. 31, 2019

(54) METHOD AND APPARATUS FOR PERFORMING ACCESS CONTROL IN NEXT GENERATION WIRELESS NETWORK

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/125,863

(22) Filed: Sep. 10, 2018

(65) Prior Publication Data

US 2019/0082376 A1   Mar. 14, 2019

(30) Foreign Application Priority Data

Sep. 8, 2017 (KR) .................. 10-2017-0115140
Jan. 11, 2018 (KR) .................. 10-2018-0004090
Aug. 20, 2018 (KR) .................. 10-2018-0096477

(51) Int. Cl.
*H04W 48/02* (2009.01)
*H04W 76/10* (2018.01)
*H04W 76/27* (2018.01)

(52) U.S. Cl.
CPC ........... *H04W 48/02* (2013.01); *H04W 76/10* (2018.02); *H04W 76/27* (2018.02)

(58) Field of Classification Search
CPC ...... H04W 48/02; H04W 76/27; H04W 76/10
USPC ...................................... 455/422.1
See application file for complete search history.

(56) References Cited

U.S. PATENT DOCUMENTS

| | | | | |
|---|---|---|---|---|
| 2011/0189971 | A1* | 8/2011 | Faccin | H04W 76/10 455/404.1 |
| 2014/0113640 | A1* | 4/2014 | Sachs | H04W 48/18 455/450 |
| 2014/0344451 | A1* | 11/2014 | Luft | H04W 4/70 709/224 |
| 2016/0135143 | A1* | 5/2016 | Won | H04W 72/005 370/312 |
| 2017/0257791 | A1* | 9/2017 | Rajadurai | H04W 28/0205 |
| 2017/0359749 | A1* | 12/2017 | Dao | H04W 28/0268 |
| 2018/0324675 | A1* | 11/2018 | Lee | H04W 48/06 |
| 2018/0376414 | A1* | 12/2018 | Zeng | H04W 8/02 |
| 2019/0174536 | A1* | 6/2019 | Han | H04W 74/0833 |

* cited by examiner

*Primary Examiner* — Inder P Mehra
(74) *Attorney, Agent, or Firm* — IP Legal Services, LLC

(57) ABSTRACT

Disclosed is a technique for an access control operation of a user equipment (UE) in a next-generation mobile communication network, and more specifically, a unified access control method for a UE and a specific access control method for a service with low sensitivity. Further, a method of a UE is provided for performing an access control operation. The method may include receiving operator-defined access category information through non-access stratum (NAS) signaling when an access attempt of the UE is triggered, determining one access category for the access attempt in an NAS layer or an access stratum (AS) layer; selecting RRC establishment cause information associated with the access category; and performing an access barring check operation in the AS layer using access barring parameters associated with the access category.

14 Claims, 8 Drawing Sheets

FIG.2

| Rule # | Type of access attempt | Requirements to be met | Access Category |
|---|---|---|---|
| 1 | Response to paging | Access attempt is for MT access | 0 (= MT_acc) |
| 2 | Emergency | UE is attempting access for an emergency session (NOTE 1, NOTE 2) | 2 (= emergency) |
| 3 | Access attempt for operator-defined access category | UE was provided with operator-defined access categories for the current PLMN, and access attempt is matching criteria of an operator-defined access category | 32-63 (= based on operator classification) |
| 4 | Access attempt for delay tolerant service | UE is configured for NAS signalling low priority, the PLMN is broadcasting one of the categories a, b or c, and the UE is a member of the broadcasted category in the selected PLMN or RPLMN/equivalent PLMN (NOTE 3, NOTE 5) | 1 (= delay tolerant) |
| 5 | MO MMTel voice call | Access attempt is for MO MMTel voice call or for NAS signalling connection recovery during ongoing MO MMTel voice call (NOTE 2) | 4 (= MO MMTel voice) |
| 6 | MO MMTel video call | Access attempt is for MO MMTel video call or for NAS signalling connection recovery during ongoing MO MMTel video call (NOTE 2) | 5 (= MO MMTel video) |
| 7 | MO SMS over NAS or MO SMSoIP | Access attempt is for MO SMS over NAS (NOTE 4) or MO SMS over SMSoIP Transfer or for NAS signalling connection recovery during ongoing MO SMS or SMSoIP transfer (NOTE 2) | 6 (= MO SMS and SMSoIP) |
| 8 | UE NAS initiated 5GMM specific procedures | Access attempt is for MO signalling | 3 (= MO_sig) |
| 9 | UE NAS initiated 5GMM connection management procedures or 5GMM NAS transport procedure | Access attempt is for MO data | 7 (= MO_data) |

*FIG.3*

| Access identities | Access categories | RRC establishment cause is set to |
|---|---|---|
| 0 | 0 (= MT_acc) | MT access |
| | 1 (= delay tolerant) | FFS |
| | 2 (= emergency) | Emergency call |
| | 3 (= MO_sig) | MO signalling |
| | 4 (= MO MMTel voice) | MO voice call |
| | 5 (= MO MMTel video) | FFS |
| | 6 (= MO SMS and SMSoIP) | FFS |
| | 7 (= MO_data) | MO data |
| 1 | Any category | "High priority access" |
| 2 | Any category | "High priority access" |
| 11, 15 | Any category | "High priority access" |
| 12,13,14, | Any category | "High priority access" |

FIG.4

| Access category number | Conditions related to UE | Type of access attempt |
|---|---|---|
| 0 | All | MO signalling resulting from paging |
| 1 | One or some of Access Classes 11-15 are set. | All |
| 2 | UE is configured for delay tolerant service and subject to access control for access category 2, which is judged based on relation of UE's HPLMN and the registred PLMN. | All |
| 3 | All except for the cases of access categories 1-2. | Emergency |
| 4 | All except for the cases of access categories 1-2. | MO signalling |
| 5 | All except for the cases of access categories 1-2. | MMTEL voice |
| 6 | All except for the cases of access categories 1-2. | MMTEL video |
| 7 | All except for the cases of access categories 1-2. | SMS |
| 8 | All except for the cases of access categories 1-2. | MO data that do not belong to any other access categories |
| 9-31 | | Reserved standardized access categories |
| 32-63 | All except for the cases of access categories 1-2 and except for roaming-UEs | Based on operator classification |

FIG.6

<ACCESS BARRING PARAMETER INFORMATION FOR EACH ACCESS CATEGORY>

```
UAB-Config ::=              SEQUENCE {
    uab-Category            ENUMERATED {},
    uab-BarringConfigID     Barring ID/ENUMERATE {}
}
uab-BarringConfigID ::=         SEQUENCE {
    Barring ID              ENUMERATE {},
    uab-BarringBitmap       BIT STRING (SIZE ())
    uab-BarringFactor           ENUMERATED {
                                    p00, p05, p10, p15, p20, p25, p30, p40,
                                    p50, p60, p70, p75, p80, p85, p90, p95},
    uab-BarringTime         ENUMERATED {s4, s8, s16, s32, s64, s128, s256,
s512},
    uab-priority            ENUMERATE { }
}
```

FIG. 7

| Access Category number (Access Category number) | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 | All | Based on operator classification |

METHOD AND APPARATUS FOR PERFORMING ACCESS CONTROL IN NEXT GENERATION WIRELESS NETWORK

CROSS REFERENCE TO RELATED APPLICATION

This application claims priority from Korean Patent Application No. 10-2017-0115140, 10-2018-0004090, & 10-2018-0096477, filed on Sep. 8, 2017, Jan. 11, 2018, & Aug. 20, 2018, which are hereby incorporated by reference for all purposes as if fully set forth herein.

BACKGROUND OF THE INVENTION

1. Field of the Invention

The present disclosure relates to a technique associated with an access control operation of a terminal in a next-generation mobile communication network, and more particularly, to a method of performing unified access control of a terminal and a method of performing specific access control for a service with low delay sensitivity.

2. Description of the Prior Art

A terminal and a network communicate with each other by utilizing limited radio resources. Also, each entity of the network utilizes limited resources for processing data. Accordingly, when the terminal communicates with the network, accessibility may be determined by various reasons.

For example, an access control function for performing congestion control in a typical network is defined and executed in different protocol layers. This is because it is necessary to control overload according to a situation related to each layer. According to such an access control function, a terminal may be restricted from accessing a base station, or a Radio Resource Control (RRC) connection may be restricted. Through this restriction, a network performs congestion control to maintain an overall network data processing speed.

Next generation mobile communication technologies are being studied in response to demands for large-capacity data processing and high-speed data processing. For mobile communication systems based on the 3rd generation partnership project (3GPP), such as Long Term Evolution (LTE), LTE-Advanced, and 5G, it is required to develop a high-speed and large-capacity communication system, which is capable of transmitting and receiving various data, such as video data and radio data, as well as performing voice-oriented services.

A typical access barring (access prohibition) mechanism has been defined by reflecting individual requirements. However, according to the typical access barring mechanism, an individual access prohibition function using different solutions was not implemented in a network and a terminal. Further, for this implementation, individual signaling was not defined and used. As a result, complexity increases, and signaling increases in network and terminal implementation.

Therefore, there is a need to solve such a problem in the next generation mobile communication technology. Further, there is a need to develop unified access control technology, which allows a terminal to perform a unified access control operation to provide diversification of services and which is flexibly applicable to various situations that may occur in next generation mobile communication.

SUMMARY OF THE INVENTION

In view of the foregoing background, the present disclosure is directed to a method and apparatus for unifying access control operations for separate mechanisms according to requirements in order to reduce implementation complexity for a user equipment (UE) and a network.

Also, the present disclosure is directed to a method and apparatus for decreasing access control signaling by integrally controlling access control operations.

Also, the present disclosure is directed to an access control method for a service that is not relatively sensitive to delay during a unified access control operation.

According to an aspect of the present disclosure, there is provided a method of a UE for performing an access control operation. The method may include receiving operator-defined access category information through non-access stratum (NAS) signaling, when an access attempt of the UE is triggered, determining one access category for the access attempt in an NAS layer or an access stratum (AS) layer; selecting Radio Resource Control (RRC) establishment cause information associated with the access category; and performing an access barring check operation in the AS layer using access barring parameters associated with the access category.

According to an aspect of the present invention, there is provided a UE for performing an access control operation. The UE may include a receiving unit configured to receive operator-defined access category information through NAS signaling; and a control unit configured to, when an access attempt of the UE is triggered, determine one access category for the access attempt in an NAS layer or an AS layer, select RRC establishment cause information associated with the access category, and perform an access barring check operation in the AS layer using access barring parameters associated with the access category.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a diagram illustrating a mapping table in which an access category is mapped to an access attempt according to an embodiment;

FIG. 3 is a diagram illustrating a table for explaining a mapping between an access category and a Radio Resource Control (RRC) establishment cause according to an embodiment;

FIG. 4 is a diagram illustrating a mapping table in which an access category is mapped to an access attempt according to another embodiment;

FIG. 6 is a diagram illustrating access prohibition parameters for each access category according to an embodiment;

FIG. 7 is a diagram illustrating a mapping table in which an access category is mapped to an access attempt according to still another embodiment.

DETAILED DESCRIPTION OF THE EXEMPLARY EMBODIMENTS

Figure 1:
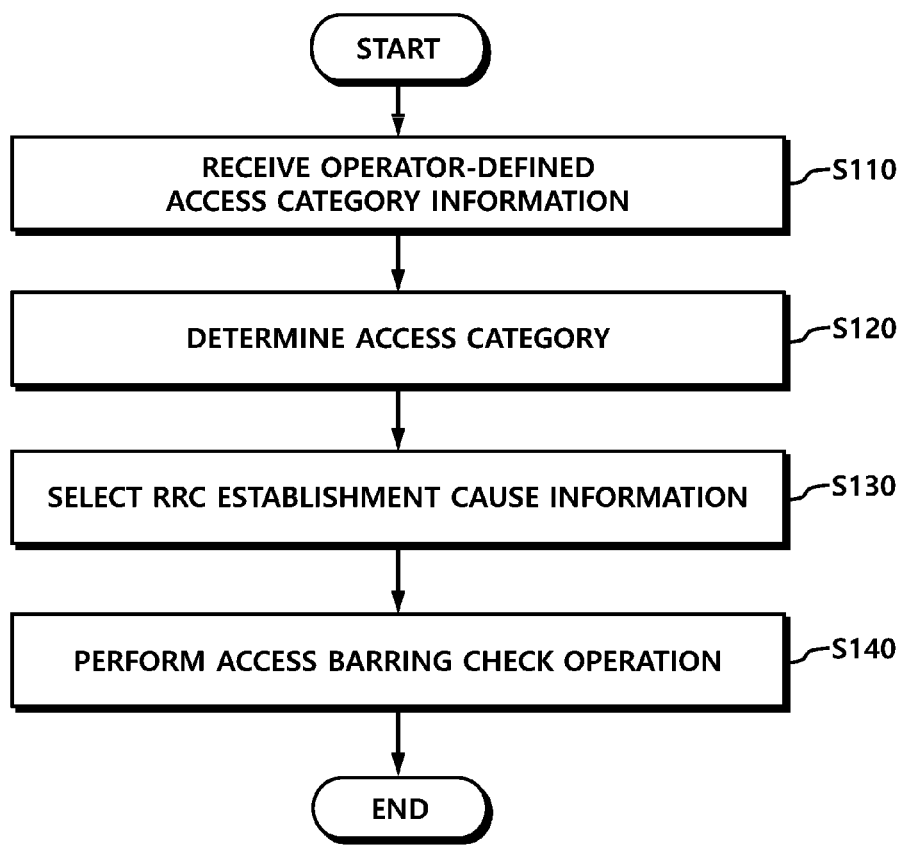
FIG. 1 is a flowchart illustrating user equipment (UE) operations according to an embodiment.

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of the present disclosure, a detailed description of known functions and configurations incorporated herein will be omitted when it is determined that the description may make the subject matter of the present disclosure unclear.

In this specification, a wireless communication system refers to a system for providing various communication services such as a voice service, a packet data service, and the like. The wireless communication system includes a user equipment (hereinafter also referred to as a UE) and a base station (hereinafter also referred to as a BS).

The user equipment may be an inclusive concept indicating a terminal utilized in wireless communication, including a mobile station (MS), a user terminal (UT), a subscriber station (SS), a wireless device, and the like in global systems for mobile communication (GSM) as well as a user equipment in wideband code division multiple access (WCDMA), long term evolution (LTE), high speed packet access (HSPA), International Mobile Telecommunications for 2020 and beyond (IMT-2020, 5G or New Radio), and the like.

The base station, or a cell, generally refers to a station that communicates with a user equipment and semantically covers a Node-B, an evolved Node-B (eNB), a gNode-B (gNB), a Low Power Node (LPN), a sector, a site, various forms of antennas, a base transceiver system (BTS), an access point, a point (e.g., a transmission point, a reception point, a transmission/reception point), a relay node, a megacell, a macrocell, a microcell, a picocell, a femtocell, a remote radio head (RRH), a radio unit (RU), a small cell, and the like.

There is a base station for controlling each of the above various cells. Thus, the base station may be construed in the following two ways: (1) the base station may be an apparatus that provides a megacell, a macrocell, a microcell, a picocell, a femtocell, and a small cell in association with a wireless area; or (2) the base station may indicate the wireless area itself. In (1), a base station may be all apparatuses that provide a predetermined wireless area and that are controlled by the same entity or all apparatuses that interact with one another to cooperatively configure a wireless area. Based on the configuration type of the wireless area, the base station may be referred to as a point, a transmission/reception point, a transmission point, a reception point, and the like may be. In (2), a base station may be a wireless area itself where signals are received or transmitted from the perspective of the user equipment or from the stance of a neighboring base station.

In this specification, the cell may refer to the coverage of a signal transmitted from a transmission/reception point (or a transmission point), a component carrier having the coverage of a signal transmitted from a transmission/reception point, or a transmission/reception point itself.

In this specification, the user equipment and the base station are used as two (uplink or downlink) inclusive transceiving subjects to embody the technology or technical concepts described in the specification and may not be limited to predetermined terms or words.

Here, uplink (UL) refers to a scheme in which a user equipment transmits and receives data to and from a base station, and downlink (DL) refers to a scheme in which the base station transmits and receives data to and from the user equipment.

UL transmission and DL transmission may be performed using i) a time division duplex (TDD) scheme in which the transmission is performed using different times, ii) a frequency division duplex (FDD) scheme in which the transmission is performed using different frequencies, or iii) a mixed scheme of the TDD scheme and the FDD scheme.

Also, a specification of a wireless communication system is defined as configuring the UL and the DL based on a single carrier or a pair of carriers.

The UL and the DL may carry control information through a control channel such as a Physical Downlink Control CHannel (PDCCH) and a Physical Uplink Control CHannel (PUCCH) and may carry data through a data channel such as a Physical Downlink Shared CHannel (PDSCH) and a Physical Uplink Shared CHannel (PUSCH).

The DL may refer to communication or a communication path from a multi-transmission/reception point to a UE, and the UL may refer to communication or a communication path from a UE to a multi-transmission/reception point. In the DL, a transmitter may be a part of the multi-transmission/reception point, and a receiver may be a part of the UE. In the UL, a transmitter may be a part of the UE, and a receiver may be a part of the multi-transmission/reception point.

Hereinafter, signal transmission and reception through a channel such as PUCCH, PUSCH, PDCCH, and PDSCH may be expressed as "PUCCH, PUSCH, PDCCH, and PDSCH are transmitted or received."

Meanwhile, higher layer signaling, which will be described below, includes Radio Resource Control (RRC) signaling that carries RRC information including RRC parameters.

The base station performs DL transmission to UEs. The base station may transmit the PDCCH for carrying downlink control information, such as scheduling needed to receive a downlink data channel, which is a primary physical channel for a unicast transmission, and also for carrying scheduling approval information for transmission through an uplink data channel. Hereinafter, transmission and reception of a signal through each channel will be described as transmission and reception of a corresponding channel.

There are no restrictions on multiple access schemes being applied to wireless communication systems. Various multiple access schemes, such as Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, and OFDM-CDMA, may be used. Here, NOMA includes Sparse Code Multiple Access (SCMA), Low Density Spreading (LDS), and the like.

An embodiment of the present disclosure is applicable to resource allocation in an asynchronous wireless communication scheme that evolves to LTE/LTE-Advanced and IMT-2020 via GSM, WCDMA, and HSPA and in a synchronous wireless communication scheme that evolves to CDMA, CDMA-2000, and Ultra-Mobile Broadband (UMB).

In this specification, a machine type communication (MTC) UE may refer to a UE that supports low cost (or low complexity), a UE that supports coverage enhancement, or the like. Alternatively, in this specification, the MTC UE may refer to a UE that is defined as a predetermined category for supporting low cost (or low complexity) and/or coverage enhancement.

In other words, in this specification, the MTC UE may refer to a newly defined third generation partnership project (3GPP) Release 13 low cost (or low complexity) UE category/type, which executes LTE-based MTC related operations. Alternatively, in this specification, the MTC UE may refer to a UE category/type that is defined in or before 3GPP Release-12 that supports the enhanced coverage in comparison with the existing LTE coverage or supports low power consumption or may refer to a newly defined Release 13 low cost (or low complexity) UE category/type. Alternatively, the MTC UE may refer to a further enhanced MTC UE, which is defined in Release-14.

In this specification, a NarrowBand Internet of Things (NB-IoT) UE refers to a UE that supports radio access for cellular IoT. The objectives of the NB-IoT technology include improved indoor coverage, large-scale support for low-rate UEs, low delay sensitivity, low UE cost, low power consumption, and an optimized network structure.

As a representative usage scenario in New Radio (NR), which is recently being discussed in the 3GPP, enhanced Mobile BroadBand (eMBB), massive Machine Type Communication (mMTC), and Ultra Reliable and Low Latency Communication (URLLC) have been proposed.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted in various meanings in the past, at present, or in the future.

For example, in this specification, LTE and NR refer to different radio access technologies, and a new radio access technology, which is being discussed in 3GPP Release 15, will be described as NR NR may have various differences from LTE in terms of a frame structure, a channel, and a core network technology, and the like. Various functions for wireless transmission, high-speed transmission, and large-scale data transmission in high bands may be added to NR.

The following embodiments may be applied to a UE, a base station, and a core network entity (e.g., Mobility Management Entity (MME), Access Management Function (AMF), and the like) which uses the next-generation mobile communication (5G mobile communication, New-RAT, and NR). If necessary, the base station may be described as a base station (a Central Unit (CU), a Distributed Unit (DU), or a single logic entity obtained by combining a CU and a DU), gNB, and the like in a 5G wireless network from which the CU and the DU are separated.

Hereinafter, for convenience of description, the conventional radio access technology will be described as LTE, and a new radio access technology being discussed in the 3GPP will be described as NR. Also, the base station may be an eNB using the LTE technology and also may be a gNB using the NR technology, which will be separately described as necessary.

New Radio (NR)

The 3GPP recently approved a study item "Study on New Radio Access Technology" for studying next generation/5G radio access technology. Based on the study item, Radio Access Network Working Group 1 (RAN WG1) is discussing frame structures, channel coding & modulation, waveform & multiple access schemes for NR.

Compared to LTE/LTE-Advanced, it is required to design NR to satisfy various needs required for segmented and designated usage scenarios as well as improved data transmission rates. In particular, as representative usage scenarios of NR, eMBB, mMTC, and URLLC were proposed. In order to satisfy requirements of each usage scenario, it is required to design NR to have a more flexible frame structure in comparison with LTE/LTE-Advanced.

In particular, as representative usage scenarios of NR, which is being discussed in the 3GPP, eMBB, mMTC, and URLLC are being considered. Since each usage scenario has different requirements for data rates, latency, coverage, and the like, there is a need for a solution for efficiently multiplexing radio resources units based on different numerologies (e.g., subcarrier spacing (SCS), subframe, transmission time interval (TTI), etc.) in order to efficiently satisfy requirements for each usage scenario through a frequency band of any NR system.

To this end, discussions have been conducted on a solution of supporting one or more time units when configuring a scheduling unit in a time domain and a method of multiplexing numerologies having different SCS values on the basis of Time Division Multiplexing (TDM), Frequency-Division Multiplexing (FDM), or TDM/FDM through a single NR carrier and supporting the multiplexed numerologies. In NR, a subframe is defined as one type of a time domain structure, and a single subframe duration is defined to be formed of 14 OFDM symbols of the same 15 kHz SCS-based normal CP overhead as that of LTE as a reference numerology for defining a corresponding subframe duration. Thus, the subframe in NR has a time duration of 1 ms. That is, unlike LTE, the subframe of NR is an absolute reference duration, and a slot and a mini-slot may be determined as time units on which actual UL/DL data scheduling is based. In this case, a value y, which is the number of OFDM symbols forming a corresponding slot, is determined as y=14 irrespective of numerologies.

Accordingly, any slot may be comprised of 14 symbols, and all symbols may be used for DL transmission, for UL transmission, or in the form of DL portion+gap+UL portion depending on a transmission direction of a corresponding slot.

Also, a mini-slot may be defined to be formed of a smaller number of symbols than that of the corresponding slot in any numerology (or SCS). Based on the definition, a time-domain scheduling interval having a short length may be set for UL/DL data transmission/reception, or a time-domain scheduling interval having a long length may be configured for UL/DL data transmission/reception through slot aggregation.

In particular, in the case of transmission and reception of latency-critical data such as URLLC, when scheduling is made in units of a slot based on 0.5 ms (7 symbols) or 1 ms (14 symbols), which is defined in a frame structure based on a numerology having a small SCS value such as 15 kHz, it may be difficult to satisfy latency requirements. Accordingly, a mini-slot may be defined to be formed of a smaller number of OFDM symbols than that of the corresponding slot, and based on the definition, latency-critical data such as URLLC may be defined to be scheduled.

As described above, different SCSs or different TTI lengths may be defined in NR. Thus, technologies have been develop to satisfy requirements of URLLC and eMBB, and new technical elements have been developed in terms of various viewpoints such as LTE, a transmitting unit structure, and a scheduling method.

In this specification, access barring is one type of access control operation that a UE performs for the purpose of network congestion control and should be interpreted to mean an access barring check operation for checking whether access is prohibited, or the like. Accordingly, access barring may be referred to by various terms such as congestion control, access control, access check, barring check, access restriction, access barring, and the like. The present disclosure should be interpreted to cover the terms.

Hereinafter, an access control operation in the typical LTE mobile communication technology, problems of the operation, and objectives of the present disclosure will be briefly described.

Access Barring Technology in LTE

In the typical LTE technology, an access control function for controlling network congestion is defined in different protocol layers. Thus, overload may be controlled depending on a situation associated with each layer. An LTE access control function includes i) a Random Access Channel (RACH) back-off function of a base station for backing off a random access channel when experiencing overload during a random access procedure, ii) a function of a base station for rejecting or releasing an RRC connection depending on radio access conditions and loads in response to an RRC connection request, and an access barring function of a base station for preventing a UE from sending an access request signal to a network.

An access prohibition (access barring) mechanism is capable of efficiently reducing loads by performing UE-based access control to prevent a UE from sending an access request signal to a network.

In the typical LTE (Evolved Universal Terrestrial Radio Access Network (E-UTRAN)), various access prohibition mechanisms are defined and used. This is because several mechanisms are defined in order to reflect various service requirements that have gradually appeared during a commercialization process of the LTE technology. Each mechanism uses a different solution. For example, Access Class Barring (ACB) provides access barring to a specific access class UE and is executed in an access stratum (AS) layer. Also, Service Specific Access Control (SSAC) provides additional control of Multimedia telephony (MMTEL) voice calls to be applied to an IP Multimedia Subsystem (IMS) layer and is executed in an application layer. Application specific Congestion control for Data Communication (ACDC) is executed in the AS layer, but needs to use parameters not defined in the 3GPP, such as an application ID. Thus, it is necessary to standardize parameters and functions, which are not defined in the 3GPP. Otherwise, this may be a factor that makes it difficult to apply these functions to a UE and a network. In addition, by controlling access from different services through various access prohibition mechanisms such as ACB skip for skipping the ACB for voice or the like, Extended Access Barring (EAB) for access control to an MTC UE, and the like, an individual access prohibition function is implemented in a network and a UE. To this end, it is necessary to define and then apply individual signaling.

Recently, the 3GPP has conducted a study on next-generation/5G radio access technology (hereinafter referred to as NR, for convenience of description). It is expected to add new functions to NR for satisfying various requirements. Among the functions, it is required to add a unified access control/barring mechanism to NR in order to satisfy various usage examples and scenarios defined in LTE. However, a detailed method thereof has not been proposed.

For convenience of description, the unified access control/barring mechanism will be described below as unified access control. In this specification, a method of a UE for performing unified access control will be described, and then various embodiments of individual operations will be described as detailed embodiments. In addition, an embodiment for performing access control for a delay-insensitive service will be separately described below, and one or more embodiments disclosed in the present specification may be applied to a UE either individually or in combination. Also, the present disclosure may be applied to any mobile communication/stationary communication/wireless communication network including LTE in addition to the next-generation (5G) mobile communication network.

First, a unified access control operation of a UE will be described.

In the unified access control operation, non-access stratum (NAS) of at least a UE which is in an RRC idle state or in an RRC inactive state may provide access category information to the RRC (AS) of the UE. Also, when the UE transmits an RRC connection request message to a base station for establishing an RRC connection, the base station may determine whether to reject a corresponding connection request. To this end, the UE may include establishment cause information in a transmission message for establishing an RC connection to the base station.

In the typical LTE technology, the establishment cause information uses a 3-bit field. When an access category is set as an establishment cause and included in message 3 (MSG3) for the unified access control, more bits may be needed, which may result in consumption of insufficient MSG3 resources. Therefore, there is a need for a method of effectively providing the establishment cause.

The present disclosure has been made to solve the above-mentioned problems, and an objective of the present disclosure is to provide a method and apparatus for providing efficient unified access control that satisfies various usage examples and scenarios in a next generation mobile communication network. The following description will focus on UE operations.

FIG. 1 is a flowchart illustrating UE operations according to an embodiment.

Referring to FIG. 1, a method of a UE for performing an access control operation may include receiving operator-defined access category information through NAS signaling (S110).

For example, the UE may perform the access control operation using i) a reference access category that is predetermined or received from the base station and ii) operator-defined access category information that is received from a base station through the NAS signaling.

For example, the reference access category may be configured as a mapping table in which an access category is determined to be mapped to the type of access attempt of the UE.

For another example, the operator-defined access category may include at least one of an access category number, a 5G QoS identifier (5QI), an application identifier for triggering an access attempt, and specific protocol data unit (PDU) session information associated with a slice.

The reference access category and the operator-defined access category are terms that are used as an example, and the present disclosure is not limited thereto. That is, the reference access category refers to category information that applies equally regardless of an operator, and the operator-defined access category refers to category information that is set and used by an operator who operates each base station.

Each of the reference access category and the operator-defined access category may include a plurality of pieces of category information, and a UE may select one or more access categories, to be described below, from among a set of categories formed of corresponding categories.

The method of the UE for performing the access control operation may include determining one access category for an access attempt of the UE in an NAS layer or an AS layer when the access attempt is triggered (S120).

For example, the UE may store the operator-defined access category information and detect whether the access attempt of the UE is triggered. The access attempt may be made by the UE to establish an RRC connection to the base station. Alternatively, the access attempt may be made by the UE to communicate with the base station.

For example, when the UE transitions from the RRC idle state to an RRC connected state or when the UE initiates a PDU session during the RRC connected state, the UE may determine that the access attempt of the UE is triggered.

For another example, when an emergency signal is required to be transmitted or when a response to a paging signal, an access attempt for a low-latency service, or a UE origination of voice data is triggered, the UE may determine that the access attempt is triggered.

In addition, the UE may determine that an access attempt is triggered through various situations according to settings of the UE, and this may be variously set depending on the type of access attempt, as shown in FIGS. 2, 4, and 7.

When the access attempt is triggered, the UE may select any one access category from among the access category information stored or configured in the UE. For example, the access category selected by the UE refers to category information selected from a set of access categories including the reference access category and the operator-defined access category information.

As described above, the UE may select an access category set for each access attempt. For example, the UE may check a rule in an order of rule numbers of a mapping table in which one or more access categories are designated for each access attempt and may determine an access category indicated by an access attempt. To this end, the UE uses a mapping table in which an access attempt is mapped to an access category.

FIG. 2 is a diagram illustrating a mapping table in which an access category is mapped to an access attempt according to an embodiment.

Referring to FIG. 2, the mapping table may be configured such that a rule number (Rule #) is mapped to the type of access attempt and an access category. Also, the mapping table may be configured using either the above-described reference access category or the operator-defined access category. Alternatively, the mapping table may be configured using both the reference access category and the operator-defined access category. That is, as shown in FIG. 2, each of reference numbers 1, 2, and 4 to 9 of the mapping table may be configured to indicate a mapping between the reference access category and the access attempt, and the reference number 3 may be configured to indicate a mapping between the operator-defined access category and the access attempt. To this end, each of access categories #32 to #63 may be configured such that the operator-defined access category is mapped to the access attempt.

Accordingly, the UE may check an access attempt according to a rule number using the mapping table configured as shown in FIG. 2. When a triggered access attempt is present, the UE may select an access category mapped to the access attempt.

When a result of checking the rule according to the mapping table is that two or more access categories are mapped to the access attempt, the UE may determine an access category having the smallest rule number. For example, although an access attempt for a delay tolerant service (a service with low delay sensitivity) is triggered, a corresponding detailed access attempt may be included in the operator-defined access category. That is, the access attempt may be mapped to both the reference access category and the operator-defined access category. In this case, since a rule number associated with the operator-defined access category is #3 and a rule number for the delay tolerant service is #4, the UE may select the operator-defined access category #3 which has a relatively small rule number.

Alternatively, when an access attempt matches the triggered access attempt, the control unit 810 may stop checking the rule numbers and select an access category mapped to the corresponding access attempt by checking the access attempts, starting from the lowest rule number of the mapping table. That is, without checking all the rule numbers, the UE may check access attempts, starting from a small rule number, and may select an access category mapped to the access attempt.

To this end, the rule numbers of the mapping table may be set to check a specific access attempt, starting from a low number. For example, the rule number of the access attempt mapped to the operator-defined access category may be set to be smaller than the rule number of the access attempt for the delay tolerant service. Since the delay tolerant service is a delay-insensitive service, the rule number of the access attempt for the delay tolerant service may be set to be greater than that of an emergency service attempt or an operator-defined access attempt.

The method of the UE for performing the access control operation may include selecting RRC establishment cause information associated with the access category (S130). The UE may select the access category corresponding to the access attempt using the mapping table and may select RRC establishment cause information associated with the selected access category. Also, as described with reference to FIG. 2, one or more reference access categories may be set in association with the operator-defied access category.

FIG. 3 is a diagram illustrating a table for explaining a mapping between an access category and an RRC establishment cause according to an embodiment.

Referring to FIG. 3, the UE selects an access category associated with an access attempt from among one or more reference access categories and selects an RRC establishment cause mapped to the selected access category. The access category and the RRC establishment cause may be associated with each other through a separate mapping table. That is, the access category and the RRC establishment cause may be mapped to each other on a one-to-one basis. The access category of FIG. 3 may indicate the selected access category of FIG. 2, and FFS may refer to a part that may be determined by selection of a UE or an operator. Alternatively, FFS may refer to a part that is not yet determined. That is, various establishment causes may be allocated to the FFS part.

Also, the method of the UE for performing the access control operation may include performing an access barring check operation in the AS layer using access barring parameters associated with the access category (S140). The UE may perform the access barring check operation using access barring parameters stored in association with the selected access category. The access barring parameters may be received from the base station or pre-stored in the UE.

The access barring parameters may have different values that are set for each access category. Accordingly, the UE confirms the access barring parameters configured in association with the determined access category and applies the corresponding parameters to perform the access barring check operation.

As described above, the UE configures the mapping table using the reference access category and the operator-defined access category and selects an access category for each access attempt according to the configured mapping table. Also, the UE may perform the access barring check operation by applying the access barring parameters configured for each access category. That is, the UE may perform the unified access barring operation. Even when an operator is changed, the access barring check operation may be performed with the same procedure by changing a corresponding mapping table. Accordingly, it is possible to satisfy various services and requirements required by NR and prevent a redundant access barring check operation.

Other embodiments of the above-described unified access control operation of the UE will be described below. The following embodiments may be applied to the UE separately from or in combination with the embodiment of FIG. 1. Also, some elements of the embodiment of FIG. 1 may be changed to, or combined with, some elements of the following embodiments and applied to the UE. Alternatively, each of the following embodiments may be applied to a detailed embodiment of the steps of FIG. 1.

FIG. 4 is a diagram illustrating a mapping table in which an access category is mapped to an access attempt according to another embodiment.

Referring to FIG. 4, access categories may have numbers #0 to #63. When a UE which is in the RRC idle state or in the RRC inactive state establishes an RRC connection, the NAS of the UE may provide access category information to the RRC (AS) of the UE. The NAS of the UE may additionally provide access attempt type information to the RRC of the UE in addition to the access category information.

The RRC of the UE may establish or resume an RRC connection by using the following methods individually or in combination. That is, the UE may transmit an RRC connection request message or an RRC connection resumption message.

Method of Indicating Information to be Included in an RRC Connection Establishment Cause or Resumption Cause through System Information When the UE transmits an RRC connection request message for establishing an RRC connection to the base station, the base station may include information utilized to determine whether to reject a connection request. For example, the UE may include establish cause information in the RRC connection request message.

Similarly, when the UE transmits an RRC connection resumption request message for resuming an RRC connection to the base station, the base station may include information utilized to determine whether to reject a connection resumption request. For example, the UE may include resumption cause information in the RRC connection resumption request message. In this specification, for convenience of description, information referenced by a base station to determine whether to reject a request will be described on the basis of the establishment cause, but the present disclosure may also be equally applied to a resumption cause. That is, the establishment cause is included in the RRC connection request message, and the resumption cause is included in the RRC connection resumption request message. In this case, characteristics of information and operations of the UE may be equally applied. In the following description, standardized access category information may refer to the above-described reference access category information, and an access category designated by an operator may refer to the above-described operator-defined access category information.

When the operator separately uses the access categories #0 to #63 and the UE adds an establishment cause for each access category to the RRC connection establishment request, at least 6 bits may be required. When the RRC-inactive UE classifies and includes initiation of RRC connection establishment/resumption triggered by the AS as an establishment cause or resumption cause, like Radio Access network (RAN) location area update (RLAU), 1 bit may be additionally required. That is, a total of 7 bits may be required.

As described above, since resources for the RRC connection request message or the RRC connection resumption request message provided through a Common Control to Channel (CCCH) should be shared between UEs in a cell or should be processed preferentially to another RRC message provided through a Dedicated Control Channel (DCCH), it is desirable to minimize the number of bits.

To this end, the base station may add, to the RRC connection establishment request, information for indicating the number of bits to be provided by the UE as an establishment cause and broadcast the RRC connection establishment request through system information.

For example, the base station may additionally broadcast information for indicating that the number of bits to be provided as establishment causes is four (0 to 15). In this case, the UE may use access category numbers #0 to #8 as establishment causes #0 to #8. Seven values are left as the remaining establishment causes #9 to #15. Some of the seven values may be used after being mapped to access category numbers #9 to #31 reserved as the standardized access category (reference access category). Also, the others of the seven values may be used after being mapped to access category (operator-defined access category) numbers #32 to #63 which may be designated by an operator.

For another example, the base station may additionally broadcast information for indicating that the number of bits to be provided as establishment causes is five (0 to 31). In this case, the UE may use access category numbers #0 to #8 as establishment causes #0 to #8. 23 values are left as the remaining establishment causes #9 to #31. Some of the 23 values may be used after being mapped to access category numbers #9 to #31 reserved as the standardized access category. Also, the others of the 23 values may be used after being mapped to access category numbers #32 to #63 which may be designated by an operator.

For still another example, the base station may additionally broadcast information for indicating that the number of bits to be provided as establishment causes is three (0 to 7).

For still another example, the base station may additionally broadcast information for indicating that the access categories #32 to #63 designated/classified by an operator are not used.

For still another example, the base station may additionally broadcast information for indicating that the reserved access categories #9 to #31 are not used.

For still another example, the base station may additionally broadcast information for indicating that the reserved access categories #9 to #31 and the access categories #32 to #63 designated/classified by the operator are not used.

When the access categories #9 to #31 reserved in a network or the operator-defined access categories #32 to #63 are not used, only the access categories #0 to #9 are included. It is possible to decrease a value to be used as an establishment cause value of the RRC connection request message by grouping access categories capable of being processed with similar priorities among the access categories #0 to #9. This will be separately described later.

Meanwhile, the information for indicating the number of bits to be provided as the above-described establishment causes may be provided through Minimum SI. Alternatively, the information for indicating the number of bits to be provided as the above-described establishment causes may be provided through other SI/a general SIB.

Alternatively, the information for indicating the number of bits to be provided as the above-described establishment causes may include mapping rule information between a corresponding access category and an establishment cause.

Alternatively, in order to prevent use of an additional bit, an establishment cause/resumption cause value triggered by AS may be designated and used as one of the access category values, like RLAU. For example, one of the numbers #9 to #31 reserved for the standardized access categories may be used. For another example, the establishment cause/resumption cause value triggered by the AS, like RLAU, may use one of the numbers #32 to #63 that may be designated by an operator.

Alternatively, the information that has been described in the embodiments may be added to the RRC connection release message and transferred to the UE. Alternatively, the base station may add, to access barring configuration information, mapping/rule/relation information regarding an establishment cause value for each access category and may transfer the access barring configuration information. Alternatively, the base station may transfer a value mapped to an establishment cause of an RRC connection request for each access category. Alternatively, the information described in the above embodiments may be transferred by a core network entity (a control plane core network entity) through NAS signaling and stored in the UE.

Alternatively, the information described in the above embodiments may be pre-configured in a UE-specific storage device (e.g., a Universal Subscriber Identity Module (USIM)/Subscriber Identity Module (SIM)) or transferred and stored by an operator (through an associated server such as a core network entity or an OTA). For example, the base station may transfer a value/rule/relation mapped to an RRC connection request for each access category.

Method of using the same Establishment Cause Value for Similar Access Categories in Order to use a Smaller Number of Bits As described above, since resources for the RRC connection request message or the RRC connection resumption request message provided through the CCCH should be shared or should be processed preferentially to another RRC message provided through the DCCH, it is desirable to minimize the number of bits.

In order to decrease the number of bits of establishment causes or resumption causes of the UE, the RRC of the UE may use the same establishment cause value for similar access categories or specific types of access categories.

The NAS of the UE may provide access category information to the RRC (AS) of the UE. The NAS of the UE may additionally provide access attempt type information to the RRC of the UE in addition to the access category information.

For example, an access category with a priority higher than a general priority may be used as one establishment cause value. For example, like access category #0, MO signaling caused from paging is an access category that should be initiated by a base station to process incoming data and should be preferentially processed in order to prevent the UE from being prohibited. The access category #0 may be classified as an access category that should be processed preferentially to a general priority and may be mapped to, and used as, an establishment cause value to be preferentially processed. A UE that maintains specific AC numbers AC11 to AC15 like access category #1 may require specific priority processing such as the use of public land mobile network (PLMN) staff, emergency service, public utilities, security service, and PLMN. Access category #1 may be an access category that should be processed preferentially to a general priority. The access category #1 may be classified as an access category that should be processed preferentially to a general priority and may be mapped to, and used as, an establishment cause value to be preferentially processed. An emergency call, like access category #3, is also an access category that should be preferentially processed. Access categories #5 (voice), #6 (image), and #7 (SMS) may be included in a basic communication service. One or more of the access categories #5, #6, and #7 may be an access category that should be processed preferentially to a general priority. For another example, access category #5 (voice) may be an access category that should be preferentially processed. For another example, access categories #5 (voice) and #7 (SMS) may be access categories that should be preferentially processed. For another example, access categories #5 (voice), #6 (image), and #7 (SMS) may be access categories that should be preferentially processed. One or more of the access categories #5, #6, and #7 may be classified as access categories that should be processed preferentially to a general priority and may be mapped to, and used as, an establishment cause value to be preferentially processed.

For another example, one or more of the reserved access categories #9 to #31 may be classified as access categories that should be preferentially processed. One or more of the access categories #9 to #31 may be classified as access categories that should be processed preferentially to a general priority and may be mapped to, and used as, an establishment cause value to be preferentially processed.

For another example, one or more of the operator-defined access categories #32 to #63 may be classified as access categories that should be preferentially processed. One or more of the access categories #32 to #63 may be classified as access categories that should be processed preferentially to a general priority and may be mapped to, and used as, an establishment cause value to be preferentially processed.

For another example, one or more of the access categories #0, #1, #3, #5, #6, and #7 may be mapped to, and used as, an establishment cause value for preferential processing. For another example, one or more of the access categories #9 to #31 or one or more of the access categories #32 to #63 may be mapped to, and used as, an establishment cause value for preferential processing.

For another example, access categories with priorities higher than a general priority may be classified and used as two establishment cause values. As an example, the access category #0 may be used as an establishment cause value for the most preferential processing. Also, the access categories #1, #3, #5, #6, and #7 may be used as an establishment cause value for the second most preferential processing. For another example, the access categories #0 and #3 may be used as an establishment cause value for the most preferential processing. Also, the access categories #1, #5, #6, and #7 may be used as an establishment cause value for the second most preferential processing. For another example, one or more of the access categories #0, #1, #3, #5, #6, and #7 may be mapped to, and used as, an establishment cause value for preferential processing. For another example, among the access categories that are not included in the establishment cause value for the most preferential processing, one or more of the access categories #0, #1, #3, #5, #6, and #7 may be mapped to, and used as, an establishment cause value for the second preferential processing. For another example, one or more of the access categories #9 to #31 or one or more of the access categories #32 to #63 may be mapped to, and used as, an establishment cause value for the second most preferential processing.

For another example, an access category with a general or normal priority or a priority similar to the general/normal priority may be used as one establishment cause value.

For another example, an access category with a general or normal priority or a similar priority may be used as one establishment cause value. For example, MO signaling caused by NAS signaling initiation like the access category #4 and MO data like the access category #8 correspond to access categories having objectives such as network access/attach/tracking area update/service request/outgoing data transmission of a normal UE. One or more of the access categories may be provided as one establishment cause value. For another example, one or more of the access categories #6, #7, and #9 to #31 plus the access categories #4 and #8 may be provided as one establishment cause value.

For another example, the reserved access categories #9 to #31 may be used as one establishment cause value.

For another example, the access categories #32 to #63 designated/classified by an operator may be used as one establishment cause value.

For another example, the access categories #32 to #63 designated/classified by an operator may be classified and used as establishment cause values for high preferential processing and low preferential processing.

For another example, the access categories #32 to #63 designated/classified by an operator may be classified and used as establishment cause values for normal preferential processing and low preferential processing.

For another example, the access category #2 is an access class for processing with priority lower than a normal priority. Accordingly, the access category #2 may include an establishment cause value classified for the access class.

For another example, like RLAU, an establishment cause/resumption cause value triggered by the AS may be mapped to, and used as, one of the access category values or the classified establishment cause value.

For another example, a total of 64 access categories are grouped, mapped to, and used as 3-bit establishment cause values. The access categories may be classified in the order of n priorities. Here, n may be a natural number ranging from 3 to 7.

For another example, i) an access category which is not designated among a total of 64 access categories or ii) an access category in which access barring is not included in access barring configuration information provided in addition to the system information or the RRC connection release message may be mapped to and used as a default establishment cause value.

For another example, the default establishment cause may use an establishment cause value mapped to an access category with a normal priority.

For another example, an access category that is not mapped to a specific establishment cause value among a total of 64 access categories may be mapped to and used as the default establishment cause value.

As described above, it is possible to decrease the number of establishment cause values by mapping a plurality of access categories to an establishment cause value. An establishment cause value that may be configured through the above-described establishment cause value mapping method will be described below.

When the establishment causes are classified into three types, (i.e., high-priority establishment causes, normal-priority establishment causes, and low-priority establishment causes), only two bits may be used as the establishment cause value of the RRC connection request, and one spare bit is left. Considering future scalability, three bits may be used, and five spare bits may be left.

When the establishment causes are classified into four types (i.e., high-priority establishment causes, normal-priority establishment causes, low-priority establishment causes, operator-designated/classified establishment causes), only two bits may be used as the establishment cause value of the RRC connection request. Considering future scalability, three bits may be used, and four spare bits may be left.

When the establishment causes are classified into four types (i.e., high-priority establishment causes, normal-priority establishment causes, low-priority establishment causes, and operator-designated/classified establishment causes), only two bits may be used as the establishment cause value of the RRC connection request. Considering future scalability, three bits may be used, and four spare bits may be left.

When the establishment causes are classified into five types (i.e., highest-priority establishment causes, second highest-priority establishment causes, normal-priority establishment causes, low-priority establishment causes, and operator-designated/classified establishment causes), only three bits may be used as the establishment cause value of the RRC connection request. Three spare bits may be left.

When the establishment causes are classified into six types (i.e., highest-priority establishment causes, second highest-priority establishment causes, normal-priority establishment causes, low-priority establishment causes, operator-designated/classified high-priority establishment causes, and operator-designated/classified low-priority establishment causes), only three bits may be used as the establishment cause value of the RRC connection request. Two spare bits may be left.

When the default establishment cause is included in the establishment causes, the number of bits used for the establishment causes may increase by one bit, and the number of spare bits may decrease by one bit in the above-described examples.

Even though the same establishment cause is included, the network may specify different access barring configurations for different access categories included in the system establishment cause through system information. When a barring check corresponding to an access barring configuration specified for an access category is successfully performed, the UE performs an RRC connection request. Thus, determination of whether to reject the request may enable access categories with similar priorities to be grouped to have the same priority establishment cause.

Meanwhile, the above-described methods may be preconfigured in and performed by a UE and a base station.

Alternatively, the above-described methods may be performed by the UE through the information included in the RRC connection release message or the system information transferred by the base station. For example, access category-specific establishment cause mapping/rule/relation information in the access bailing configuration information may be transferred. For another example, a value mapped to the establishment cause of an access category-specific RRC connection request may be transferred.

Alternatively, the above-described information described in the embodiments may be transferred by a core network entity (a control plane core network entity) through NAS signaling and stored in the UE.

Alternatively, the information described in the above embodiments may be pre-configured in a UE-specific storage device (e.g., a USIM/SIM) or transferred and stored by an operator (through an associated server such as a core network entity or an OTA). For example, a value mapped to the establishment cause of an access category-specific RRC connection request may be transferred.

The UE may transmit an RRC connection request message including establishment cause values using the information and methods described in the above embodiments.

Figure 5:
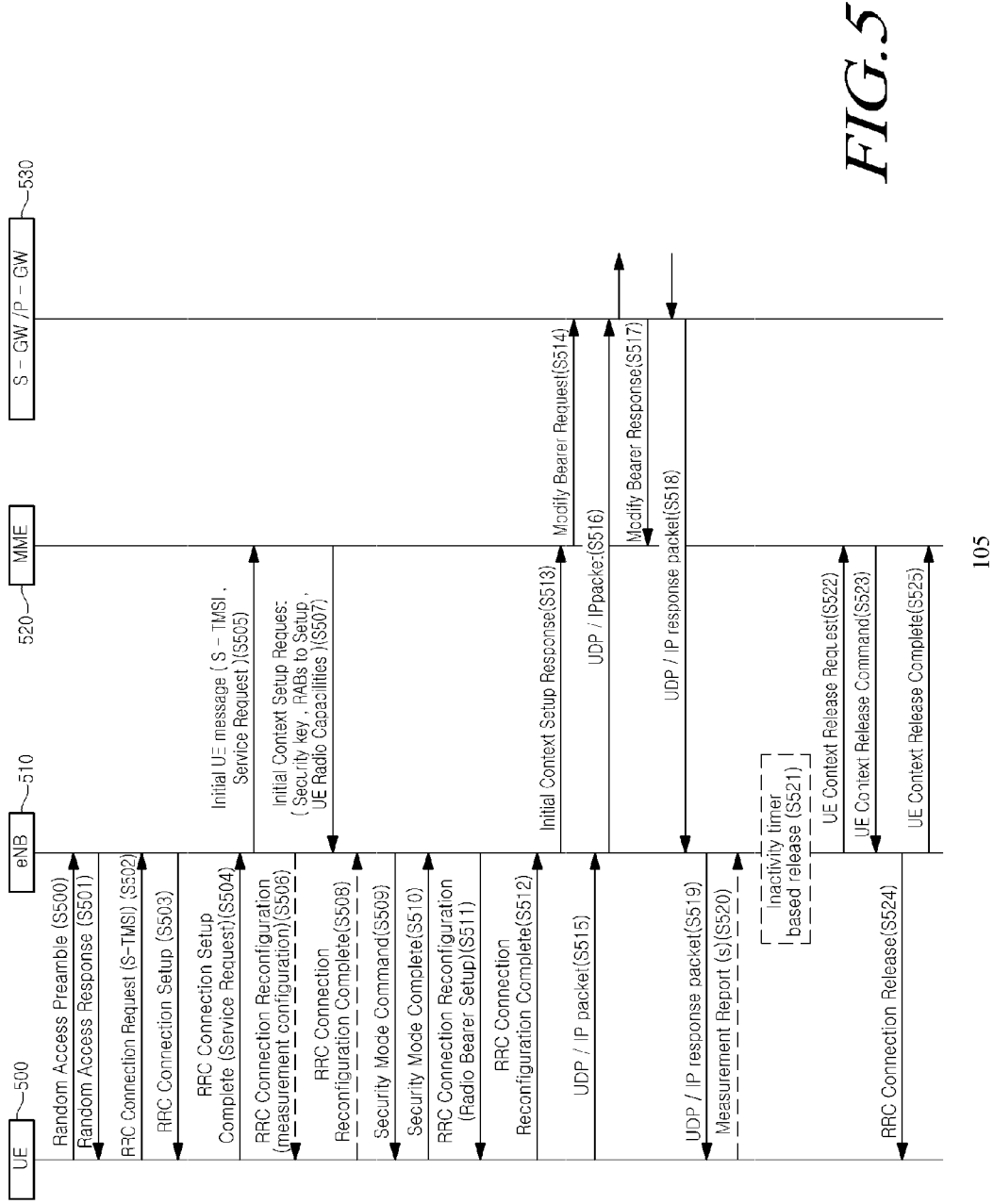
FIG. 5 is a diagram illustrating a message processing order in typical Long Term Evolution (LTE) technology.

Method of Adding Access Category Information to RRC Connection Setup Complete or RRC Connection Resume Complete Message FIG. 5 is a signal flow chart illustrating a message processing order in the typical LTE technology.

Referring to FIG. 5, a UE 500 transmits a random access preamble to an eNB 510 (S500). Subsequently, the UE 500 receives a random access response from the eNB 510 (S510) and requests the eNB 510 to re-establish an RRC connection (S502).

The eNB 510 establishes RRC connection setup for the UE (S503), and the UE 500 reports completion of the setup (S504).

When the RRC connection setup is complete in the UE 500, the eNB 510 transmits an initial UE message to a Mobility Management Entity (MME) 520 to make a service request. The MME 520 requests initial context setup from the eNB 510 (S507). Between S505 and S507, the eNB 510 may transmit an RRC connection reconfiguration message to UE 500 to establish a measurement configuration (S506). When the measurement configuration is complete, the UE 500 delivers the RRC connection reconfiguration message to the eNB 510 (S508).

The eNB 510 delivers a security mode command to the UE 500 (S509) and receives a response to the command (S510).

Subsequently, the eNB 510 delivers an RRC connection reconfiguration message from radio bearer setup to the UE 500 (S511) and receives a response to the message (S512). The eNB 510 transmits a response to the initial context setup to the MME 520 (S513), and the MME 520 delivers a bearer modification request to a gateway 530 (S514).

The UE 500 transmits a User Datagram Protocol (UDP)/Internet Protocol (IP) packet to the eNB 510 (S515), and the eNB 510 delivers the corresponding packet to the gateway 530. The gateway 530 delivers a response to the bearer modification to the MME 520 (S517) and delivers a response to the UDP/IP packet to the eNB 510 (S518). The eNB 510 delivers the corresponding packet to the UE 500 (S519).

Through such a procedure, the UE 500 delivers the packet to a core network.

Subsequently, the UE 500 transmits a measurement report to the eNB 510 periodically or upon an event occurrence depending on the measurement configuration (S520). The eNB 510 determines whether to release the UE 500 on based on the measurement report or an inactivity timer (S521). When the RRC connection of the UE 500 is determined to be released, the eNB 510 requests the MME 520 to release the UE context (S522). The MME 520 transmits a UE context release command to the eNB 510 (S523), and the eNB 510 instructs the UE 500 to release the RRC connection (S524).

After the RRC connection of the UE 100 is released, the eNB 510 transmits a response to the MME 520 (S525).

Through such a procedure, the UE and the eNB perform a connection operation and a release operation.

As described, since resources for the RRC connection request message or the RRC connection resumption request message provided through the CCCH should be shared between UEs in a cell or should be processed preferentially to another RRC message provided through the DCCH, it is desirable to minimize the number of bits. For example, it may not be desirable to add 6-bit access category information to the RRC connection request message or the RRC connection resumption request message.

However, the base station or a core network entity may need the information regarding the access categories #0 to #63 in order to perform congestion control or the like on the corresponding UE.

In order to solve the problem, the access category information may be added to the RRC connection setup compete message or the RRC connection resume complete message.

The eNB or the core network entity may use the access category information. In order to allow the core network entity to use the corresponding information, the base station may transmit specific access category information received through the RRC connection setup complete message or the RRC connection resume complete message by adding the specific access category information to the message between the base station and the core network entity (e.g., the initial UE message). A specific access category to be added to the above-described message between the eNB and the core network entity may be pre-configured by the eNB or determined through the core network entity. Alternatively, the eNB may always transmit, to the core network entity, an access category sent by the UE.

The corresponding method may be used in combination with the embodiments that have been described above.

Considerations for unified access control will be described below.

As an example for providing unified access control, an operator may classify a category for providing separate access prohibition for each specific UE (specific application, specific service, specific procedure, specific subscription information, specific QoS class mapping flow, specific authorization, specific RRC state, or a specific access barring check layer), and a separate access control operation for each access category may be performed. The operator may designate a specific UE (specific application, specific service, specific procedure, specific subscription information, specific QoS class mapping flow, specific authorization, specific RRC state, or the specific access barring check layer) as a specific category through a network. Alternatively, the operator may set information configured to designate a specific UE (specific application, specific service, specific procedure, specific subscription information, specific QoS class mapping flow, specific authorization, specific RRC state, or the specific access barring check layer) as a specific category through a network and may transfer the information to the UE.

For example, the operator may designate a specific category for a specific UE group. The operator may designate a specific category for a UE designated as AC 11-15, an operator test UE, or the like. For another example, the operator may designate a specific category for a specific service type. The operator may designate a specific category for an emergency call, high-priority access, or a public safety service/application. For another example, the operator may designate a specific category on the basis of specific subscription information. While the UE is performing a network registration process (e.g., network attach process), the core network entity may receive specific subscription information from a subscriber information server. The core network entity may provide specific indication information to the UE on the basis of the specific subscription information. The operator may designate a specific category for the UE that has received the specific indication information. When the UE includes the specific indication information, the NAS of the UE may transfer the indication information (an access category) to a lower layer (RRC) through network access. When the indication information is received, the AS of the UE may perform an access barring check according to the corresponding access category and according to the system information. For another example, the NAS of the UE may receive access barring parameters corresponding to the access category from the lower layer (RRC). Also, the NAS of the UE may perform the access barring check on network access of the corresponding access category.

For another example, the operator may designate a specific category on the basis of specific indication information configured in the UE. The UE may be configured to provide a specific function. For example, the UE may be configured to provide a specific function to a USIM. The operator may designate a specific category for the UE that has received the specific indication information. When the UE includes the specific indication information, the NAS of the UE may transfer the indication information to a lower layer (RRC) through network access. When the indication information is received, the AS of the UE may perform the access barring check according to a specific category corresponding to the indication information and according to the system information. For another example, the NAS of the UE may receive access barring parameters corresponding to the access category from the lower layer (RRC). Also, the NAS of the UE may perform the access barring check on network access of the corresponding access category.

For still another example, an application identifier may be defined as an identifier part for identifying an operator and an identifier part for identifying a corresponding application in the operator. For another example, the application identifier may be used to identify an application by designating and using an identifier range/group that may be designated by the operator in the UE.

The NAS of the UE may transfer the corresponding application identification information to the lower layer (RRC) through network access. When the application information is received, the AS of the UE may select a specific access category corresponding to the application information according to the system information and may perform the access barring check according to the selected access category. For another example, the NAS of the UE may receive access barring parameters corresponding to the access category from the lower layer (RRC). Also, the NAS of the UE may perform the access barring check on network access of the corresponding access category. For another example, an application layer of the UE may receive access barring parameters corresponding to the access category from the lower layer (RRC). Also, the application layer of the UE may perform the access barring check on network access of the corresponding access category.

For another example, an NAS layer may deliver a unified access control category to the AS. The operator may define the unified access control category. For example, the unified access control category may be mapped to any UE type, service type, subscription information type, or a combination thereof.

In the RRC layer, the unified access control may be performed on the basis of unified access control category information provided by the NAS. The RRC may perform access barring according to access category-specific access barring parameters to be broadcast through the system information. For another example, the NAS of the UE may receive access barring parameters corresponding to the access category from the lower layer (RRC). Also, the NAS of the UE may perform the access barring check on network access of the corresponding access category.

The operator should be able to map a specific application or a specific service to a category capable of access control and configure the application or service.

Barring control information for unified access control may be provided through a network. For example, the barring control information may be provided through the system information. The barring control information may be provided through Minimum SI. For another example, when additional system information is requested on the basis of Minimum SI, the additional system information request may be rejected by the base station.

For another example, specific access categories may be provided through Minimum SI. For another example, other specific access categories may be provided through other SI.

The core network entity may designate a specific UE (specific application, specific service, specific procedure, specific subscription information, specific QoS class mapping flow, specific DRB mapping information, specific authorization, specific RRC state, or the specific access barring check layer) as a specific category and may deliver the specific category to the UE and/or the base station.

When the NAS layer transfers the unified access category information, and unified access barring information is broadcast at a cell, the RRC of the UE applies a unified access barring check operation. On the other hand, when the UE attempts to initiate a specific service such as an emergency service, a barring check operation may not be performed by the initiation of the service. Information for this purpose may be provided through the system information or may be prestored and configured in the UE.

Otherwise, the RRC of the UE performs access barring according to default access category classification.

For another example, an access category for a specific UE may be defined by the subscription information and may be transferred to the UE through signaling between the UE and the core network in PDU session establishment.

For another example, an access category for a specific application/service may be defined by the subscription information and may be transferred to the UE through signaling between the UE and the core network in PDU session establishment. When the access category is received, the NAS layer of the UE may inform the AS of the access category.

When initial access does not have a specific objective, default access control may be performed.

For example, when the access category is not a specific access category, the default access control may perform the access barring check according to the access barring configuration on the basis of an access class of a USIM.

For another example, the default access control is configurable by a network, and the network may transfer the default access control to the UE through the system information.

For another example, the core network entity may transmit, to the base station, authorization information regarding whether the core network entity has authority corresponding to a specific access category (received from the subscriber information server). This process may be performed in initial access of the UE to the network. Subsequently, the UE may skip access barring for a specific access category. When the skipping of the access barring for the specific access category is not authenticated, the UE may perform access barring corresponding to the default access category. The base station does not perform the access barring check on network access of the UE while corresponding authorization is recognized. When access is made, the base station may identify the access and reject an RRC connection request. Alternatively, the base station may authenticate the UE that has received the authorization in order to bypass the access barring.

The UE may be designated as a plurality of access categories according to a network instruction. Alternatively, the UE may be designated as a plurality of access categories according to a pre-configuration. When the UE designated as the plurality of access categories desires to perform network access, the UE may perform access barring through one or more of the following methods.

For example, the access barring check may be performed on only a high-priority access category among the plurality of access categories.

For another example, the access barring check may be sequentially performed on a plurality of access categories according to priorities of the plurality of access categories. For example, when the access barring check is performed on a low-priority access category such that the access is barred, the access barring check may be performed on a subsequent low-priority access category. In this case, the access barring check may be performed after a barring timer caused by barring parameters ends. Alternatively, the access barring check may be performed irrespective of operation of the timer.

For still another example, when the access barring check is performed on a high-priority access category such that the access is barred, the access barring check may be performed on a subsequent high-priority access category. In this case, the access barring check may be performed after a barring timer caused by barring parameters ends. Alternatively, the access barring check may be performed irrespective of operation of the timer. Alternatively, this process may be transferred to the NAS layer, and the NAS may transfer the subsequent high-priority access category.

For still another example, the access baning check may be performed on only a low-priority access category among the plurality of access categories.

For still another example, the access barring check may be performed on only one access category selected from among the plurality of access categories in a pre-designated order. For example, the access barring check may be performed in the order of the rule numbers of the mapping table.

For still another example, the base station may specify priorities. This may be specified by being included in the system information or the RRC connection release message.

For example, the UE may skip the access barring check when a specific service such as an emergency service is initiated. Category information for this may be provided through the system information. Alternatively, the category information may be preconfigured. For another example, by enabling the base station to receive authentication information regarding the category for this from the core network entity, the base station should recognize confirmation of this. For another example, by enabling the UE to receive the authentication information regarding the category for this from the core network entity, the UE should bypass the access barring check only when the UE is authenticated. For another example, when the UE is configured to use a specific AC (e.g., AC 11-15), when the UE responds to paging, when an RRC connection is established due to an emergency call, or when any configuration is made by an operator, the UE may perform access without performing the specific access barring check. For example, when the UE is configured to use a specific AC (e.g., AC 11-15) in a selected PLMN, the UE may perform access without performing the specific access barring check.

For still another example, when the UE is included in a specific access category in a differential allowable category group, the UE may be prevented from initiating establishment of an RRC connection in a cell until system information of the cell is received for the access category. The base station or the core network entity may transfer the access category to the UE. The base station or the core network entity may transfer, to the UE, information for instructing the UE to not initiate establishment of an RRC connection in the cell until the system information of the cell is received for the corresponding access category.

For still another example, when the UE is included in a specific access category, the UE may be prevented from initiating establishment of an RRC connection in a cell until system information of the cell is received for the access category. The base station or the core network entity may transfer the access category to the UE. The base station or the core network entity may transfer, to the UE, information for instructing the UE not to initiate establishment of an RRC connection in the cell until the system information of the cell is received for the corresponding access category.

For still another example, when the UE is prohibited from performing access as a result of the access barring check and a network connection is attempted due to an access category with a priority higher than that of the category in which the UE is prohibited from performing access, the UE may perform the access barring check corresponding to the access category.

For still another example, when the UE is prohibited from performing access as a result of the access barring check and a network connection is attempted due to an access category with a priority lower than that of the category in which the UE is prohibited from performing access, the UE may be considered as being prohibited from performing access even in the access category.

For still another example, when the UE is prohibited from performing access as a result of the access barring check, and a network connection is attempted due to an access category with a priority lower than that of the category in which the UE is prohibited from performing access, the UE may start or restart an access barring timer due to access to the corresponding access category.

Access barring being performed when the UE is in the RRC connected state may have a bad impact on quality for a user. Accordingly, it may be desirable to release the RRC connection or adjust a load through scheduling. However, access barring may be inevitably performed through the system information even when RRC connection release signaling is difficult.

In this case, the base station may broadcast indication information for providing access prohibition classified according to a specific application, specific service, specific procedure (specific PDU session), specific subscription information, specific QoS class mapping flow, specific radio bearer, or specific QoS flow/radio bearer combination.

When the information for instructing access barring of a specific application, specific service, specific PDU session, specific UE configuration, specific QoS flow, specific radio bearer, or specific QoS flow/radio bearer combination is present while the UE is in the RRC connected state, the UE sets barring parameters for the information. Also, as an example, the RRC of the UE delivers the barring parameters to an upper layer that initiates a corresponding application or service. In the upper layer, an access barring check operation is performed.

For another example, when a specific PDU session is initiated for the UE that is in the RRC connected state or when signaling for processing data corresponding to a specific QoS flow is detected, the BAS may transmit information for indicating this to the AS (in addition to the access category). The AS performs an access barring check operation for this.

For another example, the RRC of the UE delivers this to a layer 2 entity for processing radio bearer data mapped to a specific QoS flow or a specific UE configuration while the UE is in the RRC connected state. Such an entity may be a PDCP entity or an entity for processing QoS above PDCP (e.g., a PDAP entity). The layer 2 entity performs the corresponding access barring check operation. When the access is prohibited, the layer 2 entity does not initiate a UL transmission procedure through the corresponding cell. That is, the layer 2 entity stops or suspends the UL transmission procedure. Also, a Service Data Adaptation Protocol (SDAP) entity transmits information regarding this to the RRC.

For another example, when the UE is in the RRC connected state and the layer 2 entity (Packet Data Convergence Protocol (PDCP) entity or SDAP entity), which processes radio bearer data mapped to a specific UE configuration or a specific QoS flow, detects the specific DRB, the specific QoS flow, or signaling for processing data corresponding to the specific QoS flow or the specific PDU session of the UE, the layer 2 entity may transmit this to the RRC of the UE to perform the access barring check. Alternatively, the layer 2 entity may receive a parameter for AC check through the RRC to perform the access barring check.

Barring configuration information transferred by the base station to the UE may configure one or more of a barring category, a barring layer, and a barring parameter.

For another example, barring configuration information transferred by a network to the UE may configure one or more of a barring category, a barring layer, and a barring parameter. Furthermore, Barring ID may be transferred.

For example, one or more of a barring target, a barring layer, and a barring parameter may be configured through the Barring ID.

FIG. 6 is a diagram illustrating an example of access prohibition parameter configuration for each access category according to an embodiment.

Referring to FIG. 6, one or more of the following parameters may be selectively used.

uab-category: this parameter indicates information for indicating a UE access category to which access barring is to be applied.

uab-BarringBitmap: this parameter indicates information indicating access barring included in corresponding barring configuration information (or barring configuration information having a corresponding barring configuration information identifier). The first/leftmost bit is the first value in the specific access category AC or the first value among the values configured in the UE, and the second bit is the second value in the specific AC or the second value among the values configured in the UE.

uab-Barringfactor: this parameter indicates a barring factor for access check included in corresponding barring configuration information (or barring configuration information having a corresponding barring configuration information identifier).

uab-BarringTime: this parameter indicates a barring time required when barring is performed during access check included in corresponding barring configuration information (or barring configuration information having a corresponding barring configuration information identifier).

Barring ID: this parameter indicates identification information for identifying corresponding barring configuration information.

uab-priority: this parameter indicates a priority class or priority indication information for access barring processing.

Thus, barring configuration information mapped to a specific category may be identified through the barring ID.

In NR, reflective QoS may be supported through the RAN under the control of a network. When the network determines QoS to be applied to DL traffic, the UE reflects the DL QoS in associated UL traffic. When the UE receives a DL packet to which the reflective QoS is applied, the UE creates a new QoS rule. A packet filter in the created QoS rule is derived from a DL packet (a packet header).

In NR, a default QoS rule is provided to the UE in the PUD session settings. A pre-authenticated QoS rule may be provided to the UE in the PDU session settings. An NAS level QoS profile of the QoS rule may be delivered to the RAN through NG2 signaling over a wireless network in the PDU session settings. The QoS rule including an NAS level QoS profile, a packet filter, a precedence order, and a 5QI (or QoS flow ID). The QoS rule may further include a QoS flow ID, an application identifier, and 5QI and information for identifying a specific application/service/flow.

A QoS rule signaled to the UE connected through 3GPP access-based NG RAN is provided through NG1 signaling.

Application/service may be identified in association with a QoS or the above-described QoS rule (or QoS indication information or QoS associated application/service identification information; hereinafter referred to as a QoS rule for convenience of description). For example, a QoS recognition application may indicate a requested QoS using Differentiated Services Code Point (DSCP) marking. An application/service associated with the QoS may be identified using a packet filter including the DSCP marking.

This may use a default QoS rule provided to the UE in the PDU session settings or may be a pre-authenticated QoS rule provided to the UE in the PDU session settings. Alternatively, this may be a QoS rule pre-configured in the UE or may be provided to the USIM of the UE through OTA. Alternatively, this may use a default QoS rule provided to the UE in the previous PDU session settings or may be a pre-authenticated QoS rule provided to the UE in the PDU session settings.

The UE may identify access category information of a corresponding application/service/traffic/flow based on QoS information (e.g., marking information, QoS flow information, etc.) transferred from the base station or received from the base station. The UE may perform access barring corresponding to an access category of the application/service/traffic/flow on a network connection from the access category.

For example, the identification of the access category information of the application/service/traffic/flow based on the QoS information (e.g., marking information, QoS flow information, etc.) may be provided to a PDCP entity or an entity for processing a QoS over PDCP (e.g., a PDAP entity). For another example, the identification of the access category information of the application/service/traffic/flow based on the QoS information (e.g., marking information, QoS flow information, etc.) may be applied to the UE which is in the RRC connected state. For another example, the identification of the access category information of the application/service/traffic/flow based on the QoS information (e.g., marking information, QoS flow information, etc.) may be applied when the UE which is in the RRC idle state or the RRC inactive state performs access barring through previous UE context or previous UE connection information.

As described above, the UE may perform the access barring check operation through the unified access control operation and may efficiently perform an RRC connection even under an environment in which requirements of NR are reflected.

An access control operation considering a delay-insensitive UE or a delay-insensitive service among the unified access control operation will be described below in detail. That is, in the following description, the delay-insensitive UE may refer to a delay tolerant UE, and delay-insensitive service may refer to a delay tolerant service.

Delay-Insensitive UE (Delay Tolerant UE)

In the typical LTE technology, some UEs have time-tolerant or delay-tolerant characteristics. For example, some MTC UEs may perform delay-insensitive data communication. In the typical LTE technology, access control for the delay-insensitive UE was provided in the following schemes.

The first scheme is to use RRC connection rejection procedure. When the UE delivers an RRC connection request/resume message having delay tolerance access as an establishment cause to the base station, the base station may deliver an RRC connection rejection message to the UE. Thus, the UE informs upper layers of a failure in access control corresponding to the RRC connection establishment request.

The second scheme is to define UE capability capable of expanded barring among delay-insensitive UEs and use EAB based on system information for a corresponding UE. The corresponding UE should maintain recent EAB-associated system information in the RRC idle and should perform an EAB check in the RRC connection establishment.

For example, the UE shall not initiate the RRC connection establishment/resume procedure subject to EAB until the UE has a valid version of SystemInformationBlockType 14.
1> if the UE is EAB capable:
2> when the UE does not have stored a valid version of SystemInformationBlockType14 upon entering RRC_IDLE, or when the UE acquires SystemInformationBlockType1 following EAB parameter change notification, or upon entering a cell during RRC_IDLE, or before establishing an RRC connection if using eDRX with DRX cycle longer than the modification period:
3> if schedulingInfoList indicates that SystemInformationBlockType14 is present:
4> start acquiring SystemInformationBlock Type 14 immediately; 3> else:
4> discard SystemInformationBlockType14, if previously received;

Meanwhile, the delay-insensitive UE may be of various types. In this case, although UEs correspond to a category having delay-sensitive characteristics in common, an operator may intend to perform different access control/prohibition in consideration of other characteristics. However, a specific unified access control/prohibition method considering various use cases and characteristics is not provided.

The present disclosure is directed to providing a method and apparatus for providing unified access control to a delay-insensitive UE in consideration of various usages and scenarios of the delay-insensitive UE.

Although the method and apparatus of providing access control on a delay-insensitive UE (delay tolerant UE) through the unified access control will be described below, the description may also be applied to normal UEs that are capable of providing the corresponding function. The following embodiments may be carried out individually or in combination. Also, the present disclosure may be applied to any mobile communication/stationary communication/wireless communication network including LTE in addition to the next-generation (5G) mobile communication network. The present disclosure may be provided to a 5G network provided through an NR base station (gNB). Alternatively, the embodiments of the present disclosure may be applied to an LTE network provided through an LTE base station (eNB). Alternatively, the embodiments of the present disclosure may be applied to an eLTE network provided through an eLTE base station (e.g., an ng-eNB) connected to a 5G core network. Alternatively, the embodiments of the present disclosure may be applied to a UE that accesses the 5G core network using NR and a UE that accesses the 5G core network using Evolved Universal Terrestrial Radio Access (E-UTRA). Also, a delay-insensitive service and a service with low delay sensitivity are used in the same sense as the delay tolerance service, and the term may be changed as needed.

For convenience of description, the following description will be made on the basis of a UE configured for a delay-insensitive service, but may be applied to a UE configured with arbitrary configuration information. The following description may also be applied to a case in which the UE is configured with arbitrary configuration, a case in which the arbitrary configuration includes an access identifier, and a case in which the arbitrary configuration is designated and used as an access category.

For the UE configured to provide a delay-insensitive service, the following methods may be used individually or in combination.

First, a method of configuring a UE for a delay-insensitive service will be described.

The UE for delay-insensitive service may be enabled to process NAS signaling with a lower priority than that of a typical UE. To this end, device property information (device properties IEs) for processing NAS signaling with a low priority is defined among information elements contained in an NAS message. When the device property information includes a low-priority indicator set for indicating that the UE includes a low NAS signaling priority upon occurrence of overload, the NAS signaling may be preferentially rejected. Such a low NAS signaling priority may be allocated/configured/set for each device. For example, a specific UE may be configured/set with a low priority, and another specific UE may not be set with the priority.

The UE for delay-insensitive service may provide an EAB function. To this end, EAB device property information, which is separated from the device property information for processing NAS signaling with a low priority, is defined among the information elements contained in the above NAS message. When information for indicating access barring for an EAB capable EU through the system information is broadcast upon occurrence of overload, the UE may perform the EAB check. The EAB device property information may also be allocated/configured/set for each device.

The UE may be configured to provide a delay-insensitive service. For example, the UE may include configuration information for providing NAS signaling with low priority.

For another example, the UE may include configuration information for allowing dual priority NAS signaling in order to enable even the UE configured to provide the NAS signaling with low priority to perform the NAS signaling without the low priority (or with a normal priority, a high priority, or a priority that is not low; for convenience of description, a priority that is not low is expressed as a normal priority; however, the normal priority may refer to any priority except for a low priority).

For another example, the UE may include configuration information for providing access barring (which is similar to the above-described EAB).

For another example, the UE may include configuration information for supporting the above-described functions.

For another example, the UE may provide one or more of the above-described functions by including single configuration information for delay-insensitive service.

For convenience of description, the configuration information for delay-insensitive service may refer to the above-described one or more pieces of configuration information.

The UE may be configured for a delay-insensitive service.

For example, when the UE performs one or more of a registration procedure (e.g., attach procedure), a PDU session establishment procedure, a tracking region update procedure, and a service request procedure, the network (e.g., a core network entity, a core network control plane entity, an AMF, and the like) may instruct the UE to be configured for delay-insensitive service (on the basis of subscription information). The UE may configure, store, or set the indication information in UE context/NAS context/NAS device property information/UE-specific device property information.

For another example, detailed information of the UE configured for delay-insensitive service may be configured. When the UE performs one or more of a registration procedure (e.g., an attach procedure), a PDU session establishment procedure, a tracking region update procedure, and a service request procedure, the network (e.g., a core network entity, a core network control plane entity, an AMF, and the like) may instruct the UE to include the detailed information (e.g., on the basis of subscription information). The UE may configure, store, or set the detailed indication information in the UE context/NAS context/NAS device property information/UE-specific device property information.

For another example, for delay-insensitive service on the USIM, the UE may be configured, stored, or set as a specific access category.

For another example, for delay-insensitive service on the USIM, the UE may have indication information configured, stored, or set therein. For another example, the detailed information of the UE configured for delay-insensitive service may be configured, stored, or set on the USIM.

Method of Performing Access Control/Prohibition Processing by using Barring Configuration Information Associated with and According to Indication Information Provided by NAS Different criteria such as an operator policy, a deployment scenario, a subscriber profile, and an available service are used to determine whether an access attempt is allowed or blocked when congestion occurs within a 5G system. The different criteria for the access control may be associated with the indication information provided by the NAS.

The 5G system may provide single unified access control that is performed by an operator to control access on the basis of the indication information provided by the NAS.

The configuration information for delay-insensitive service may be configured, included, or stored in the UE. The network may broadcast, through the system information, the barring configuration information (e.g., a barring parameter list and a barring parameter list corresponding to the detailed information) for the access barring of the UE configured for delay-insensitive service. The UE may determine whether to allow a specific access attempt on the basis of the indication information provided by the NAS and the configuration of the UE and the barring parameters received through the broadcast barring configuration information.

For example, the AS (e.g., RRC) of the UE may determine whether to allow a specific access attempt on the basis of indication information received from the upper layer (e.g., the NAS) of the UE and the barring parameters received through the broadcast barring configuration information.

For example, the indication information received from the NAS may be access category number information. An access category number indicates a number determined according to an access attempt type and a UE-associated condition. Unified access control may be applied when a UE in the RRC idle state establishes an RRC connection due to an instruction from the upper layer, when a UE in the RRC inactive state establishes an RRC connection due to outgoing signaling of the upper layer (e.g., NAS) or outgoing data (MO data) of the upper layer (e.g., an Internet protocol (IP) layer), or when a UE in the RRC connected state initiates a new access attempt (e.g., new PDU session establishment, existing PDU session modification, service request for requesting user plane resetting for existing PUD session, new MMTEL voice or video session, and short message service (SMS) transmission). In the unified access control, the NAS transfers, to the AS of the UE, one access category determined according to the access attempt type and the UE-associated condition.

For another example, the indication information received from the NAS may be additional indication information that is separated from the access category number.

When an RRC connection is established in the RRC idle state by an instruction from the upper layer, when an RRC connection is established in the RRC inactive state by outgoing signaling of the upper layer (e.g., NAS) or outgoing data (MO data) of the upper layer (e.g., the IP layer), or when a new access attempt is initiated in the RRC connected state, the NAS of the UE configured for delay-insensitive service (hereinafter referred to as a UE includes configuration information for delay-insensitive service) transfers, to the AS of the UE, one access category determined according to the access attempt type and the UE-associated condition.

Alternatively, the NAS transfers additional information that is separated from the access category number.

For example, the NAS of the UE configured for a delay-sensitive service may transfer, to the AS, specific access category information defined for this.

For another example, when an emergency access attempt (e.g., an emergency bearer service, an emergency call, an emergency flow, an emergency PDU session, etc.) is made, even the NAS of the UE configured for the delay-sensitive service may transfer specific access category information defined for emergency to the AS.

For another example, the NAS of the UE configured for the delay-sensitive service may transfer, to the AS, specific access category information defined for the UE configured for the delay-sensitive service, except for emergency access attempts.

For another example, when a standardized specific access attempt (e.g., an access attempt caused by one of MO signaling with a normal priority, MO data with a normal priority, MMTEL voice/video, and SMS) is made, the NAS of even the UE configured for the delay-sensitive service may transfer, to the AS, specific access category information defined for the standardized specific access attempt.

For another example, when a specific access attempt (e.g., an access attempt caused by one of MO signaling with a normal priority, MO data with a normal priority, MMTEL voice/video, and SMS) standardized by an upper application is made, the NAS of even the UE that is configured for the delay-sensitive service and that has a normal priority or a duel priority and allows the specific access attempt through detained configuration information for the delay-sensitive service may transfer, to the AS, specific access category information defined for the standardized specific access attempt.

By using the access category information received from the NAS, the AS of the UE performs the barring check on the access category according to barring configuration information broadcast by the base station. For example, the NAS of even the UE configured for the delay-sensitive service may identify an access category and transfer the identified access category (according to a specific configuration), and the AS of the UE may perform the barring check according to the access category. When the NAS of even the UE configured for the delay-sensitive service transfers an MO data access category (e.g., access category #7) to the AS, the AS may perform the barring check according to barring configuration information associated with the MO data access category. When the NAS of the UE configured for the delay-sensitive service transfers an access category for the UE configured for the delay-sensitive service (e.g., access category #2) to the AS, the AS may perform the barring check according to barring configuration information associated with a data access category for the UE configured for the delay-sensitive service. When the NAS of the UE configured for the delay-sensitive service transfers, to the AS, additional indication information for the UE configured for the delay-sensitive service and any access category, the AS may perform the barring check according to barring configuration information associated with the additional indication information for the UE configured for the delay-sensitive service.

An operation of the base station broadcasting access category-based barring configuration information and an operation of the UE based on the barring configuration information may be used with reference to the following embodiments.

Method of Configuring a UE Configured for a Delay-Insensitive Service with a Specific Access Identifier/Identity and Performing an Access Control/Prohibition Operation on the Basis of the Access Identifier/Identity Different criteria such as an operator policy, a deployment scenario, a subscriber profile, and an available service are used to determine whether an access attempt is allowed or blocked when congestion occurs within a 5G system. The different criteria for the access control may be processed in association with an access identifier configured/established/set in the UE. The 5G system provides single unified access control in which an operator controls access by additionally using the access identifier.

The configuration information for delay-insensitive service may be configured in the UE. The network may broadcast, through the system information, the barring configuration information (a barring parameter list and a barring parameter list corresponding to the detailed information) for the access barring of the UE configured for delay-insensitive service. The UE may determine whether to allow a specific access attempt on the basis of the configuration of the UE and the barring parameters received through the broadcast barring configuration information.

The AS of the UE may determine whether to allow a specific access attempt on the basis of one or more of the barring parameters received through the broadcast barring configuration information, the configuration of the UE, and the access category received from the AS of the UE.

For example, the configuration information for delay-insensitive service may be an access identifier/identity, which is information configured in the UE for the purpose of access control/prohibition. The configuration information for delay-insensitive service used for the UE for delay-insensitive service as the access identifier may be configured, included, or stored in the UE as described above.

First, a method of identifying the UE for delay-insensitive service using an access identifier, instead of a specific access category, and performing the barring check will be described.

The UE configured for delay-insensitive service may be configured with a specific access identifier. For example, the UE may be configured with an access identifier for providing NAS signaling with low priority.

For another example, even the UE configured to provide NAS signaling with low priority may be configured with access identifier information for allowing NAS signaling with dual priority such that the UE performs NAS signaling without lower priority (or with a normal priority).

For another example, the UE may be configured with access identifier information for providing access barring (which is similar to the above-described EAB).

For another example, the UE may be configured with access identifier information for supporting the above-described functions. For another example, the UE may provide one or more of the above-described functions by being configured with single access identifier information for delay-insensitive service.

When a UE in the RRC idle state establishes an RRC connection due to an instruction from the upper layer, when a UE in the RRC inactive state establishes an RRC connection due to outgoing signaling of the upper layer (e.g., NAS) or outgoing data (MO data) of the upper layer (e.g., the IP layer), or when a UE which is in the RRC connected state initiates a new access attempt (e.g., new PDU session establishment, existing PDU session modification, service request for requesting user plane resetting for existing PUD session, new MMTEL voice or video session, and SMS transmission), unified access control may be applied. In the unified access control, the NAS transfers, to the AS of the UE, one access category determined according to the access attempt type and the UE-associated condition.

When an RRC connection is established in the RRC idle state by an instruction from the upper layer, when an RRC connection is established in the RRC inactive state by outgoing signaling of the upper layer (e.g., NAS) or outgoing data (MO data) of the upper layer (e.g., the IP layer), or when a new access attempt is initiated in the RRC connected state, the NAS of the UE having the specific access identifier configured for delay-insensitive service transfers, to the AS of the UE, one access category determined according to the access attempt type and the UE-associated condition. Alternatively, the NAS transfers additional information that is separated from the access category number.

For example, the NAS of the UE having the specific access identifier configured for the delay-sensitive service may transfer, to the AS, specific access category information identified/defined according to a standardized specific access attempt (e.g., an access attempt through one of MO signaling caused from paging, emergency, MO signaling caused from factors other than paging, MMTEL voice/video, SMS, and MO data).

For another example, the NAS of the UE having the specific access identifier configured for the delay-sensitive service, may transfer, to the AS, an access identifier (or corresponding configuration information) configured for the delay-sensitive service.

The AS of the UE performs the barring check according to the access category information received from the NAS, the access identifier information configured in the UE (or the access identifier information received from the NAS), and the barring configuration information broadcast by the base station. The barring configuration information broadcast by the base station may include access category-specific access barring configuration information and access identifier-specific access barring configuration information.

As an example, when the UE having the specific access identifier configured for the service-sensitive service receives barring configuration information for the access identifier broadcast from the base station, the UE performs the barring check on a new access attempt through the barring configuration information for the access identifier. When a result of the barring check is that the barring is determined as being performed, the UE considers the cell as being barred. Otherwise, the UE considers the cell as not being barred.

For another example, when the UE having the specific access identifier configured for the service-sensitive service receives barring configuration information for the access identifier broadcast from the base station, the UE performs the barring check on a new access attempt through the barring configuration information for the access identifier. When a result of the barring check is that the barring is determined as being performed, the UE considers the cell as being barred. Otherwise, the UE performs the barring check on the corresponding access attempt through the barring configuration information for the access category received from the NAS. When a result of the barring check is that the barring is determined as being performed, the UE considers the cell as being barred. Otherwise, the UE considers the cell as not being barred.

For another example, when the UE having the specific access identifier configured for the service-sensitive service receives barring configuration information for the access identifier broadcast from the base station, the UE performs the barring check on a new access attempt through the barring configuration information for the access identifier without performing the barring check through the barring configuration information for the access category.

For another example, when the UE having the specific access identifier configured for the service-sensitive service receives barring configuration information for the access identifier broadcast from the base station, the UE performs the barring check on a new access attempt in further consideration of the barring configuration information for the access category.

For another example, when the NAS of the UE having the specific access identifier configured for the delay-sensitive service transfers, to the AS, specific access category information identified/defined according to a specific access attempt with high priority (e.g., an access attempt through one or more of emergency, MO signaling caused from factors other than paging, MMTEL voice/video, and SMS), the AS of the UE may perform the barring check on a new access attempt on the basis of access barring configuration information for a corresponding access category. For example, when the access barring configuration information for an emergency communication access category indicates skipping of the barring check or indicates allowance of the access attempt, the AS of the UE may skip the access barring check or allow the access attempt. Alternatively, the UE performs the barring check on an MMTEL voice access category according to the access barring configuration information broadcast by the base station.

For another example, when the NAS of the UE having the specific access identifier configured for the delay-sensitive service transfers, to the AS, specific access category information identified/defined according to a specific access attempt with normal priority (e.g., an access attempt through one or more of MO signaling caused from factors other than paging and MO data), the AS of the UE may perform the barring check on a new access attempt on the basis of access barring configuration information for a corresponding access category. For example, the AS of the UE may perform the barring check using the access barring configuration information for the corresponding access category.

For another example, when the NAS of the UE having the specific access identifier configured for the delay-sensitive service transfers, to the AS, specific access category information identified/defined according to a specific access attempt with normal priority (e.g., an access attempt through one or more of MO signaling caused from factors other than paging and MO data), the AS of the UE may perform the barring check on a new access attempt on the basis of access barring configuration information for the access identifier configured in the UE. For example, the AS of the UE may override, reject, or skip bailing check through the access barring configuration information for the access category by performing the barring check using the access barring configuration information for the access identifier.

For another example, when the NAS of the UE having the specific access identifier configured for the delay-sensitive service transfers, to the AS, standardized access category information identified/defined according to a standardized access attempt (e.g., an access category corresponding to an access attempt for one of MO signaling caused from paging, emergency, MO signaling caused from factors other than paging, MMTEL voice/video, SMS, and MO data), the AS of the UE may perform the barring check on a new access attempt on the basis of access barring configuration information for the access identifier configured in the UE.

As the access barring configuration information for the access identifier broadcast by the base station, the UE having the corresponding access identifier may include barring bitmap configuration information for each standardized access category (MO signaling, emergency, MO signaling caused from factors other than paging, MMTEL voice/video, SMS, and MO data). A corresponding bit may refer to information used by the UE having the access identifier (configuration information) configured for delay-insensitive service to indicate whether the barring is applied to an access attempt of a corresponding access category (to the access category received from the NAS). Alternatively, a corresponding bit may refer to information for indicating allowance of access in response to an access attempt (the access category received from the NAS) of an access category corresponding to a UE having the access identifier (configuration information) configured for delay-insensitive service, allowance of an access attempt on which access control is performed (or which access is barred), overriding of the access attempt allowance or the access barring, skipping of the access control, or access control/barring prohibition/allowance for a UE capable of providing both delay-insensitive service and another priority (or service).

When the UE includes or stores any configuration information (or an access identifier), the UE having the corresponding configuration information (or the access identifier) may include barring bitmap configuration information for one or more of the standardized access categories, as the barring configuration information for the configuration information (or the access identifier) broadcast by the base station. The UE having the corresponding configuration information (or the access identifier) may perform the barring check using barring configuration information associated with the configuration information (or the access identifier) separate from barring configuration information associated with the access category.

When the UE has one or more access identifiers (configuration information), the UE may perform the barring check according to access barring configuration information associated with an access identifier having a specific order (e.g., a highest priority, an order indicated by the base station, a pre-configured order, etc.).

When the UE for delay-insensitive service is classified as a specific access category and the NAS transfers the access category to the AS, the following procedure may be applied.

For example, when the NAS of the UE having the specific access identifier configured for the delay-sensitive service transfers, to the AS, specific access category information identified/defined according to a specific access attempt with high priority (e.g., an access attempt through one or more of emergency, MO signaling caused from factors other than paging, MMTEL voice/video, and SMS), the AS of the UE may perform the barring check on a new access attempt on the basis of access barring configuration information for a corresponding access category. For example, when the access barring configuration information for emergency communication indicates skipping of the barring check or indicates allowance of the access attempt, the AS of the UE may skip the access barring check or allow the access attempt. The AS of the UE may skip the barring check or allow the access attempt through the access barring configuration information for the access identifier.

For another example, when the NAS of the UE having the specific access identifier configured for the delay-sensitive service transfers, to the AS, specific access category information identified/defined according to a specific access attempt with normal priority (e.g., an access attempt through one or more of MO signaling caused from factors other than paging and MO data), the AS of the UE may perform the barring check on a new access attempt on the basis of access barring configuration information for the access identifier configured in the UE. For example, the AS of the UE may override, reject, or skip barring check through the access barring configuration information for the access category by performing the barring check using the access barring configuration information for the access identifier.

For another example, when the NAS of the UE having the specific access identifier configured for the delay-sensitive service transfers, to the AS, access category information for the UE, the AS of the UE may perform the barring check on a new access attempt on the basis of access barring configuration information for the access identifier configured in the UE. For example, the AS of the UE may override, reject, or skip barring check through the access barring configuration information for the access category by performing the barring check using the access barring configuration information for the access identifier.

For another example, when the NAS of the UE having the specific access identifier configured for the delay-sensitive service, transfers, to the AS, access category information for the UE, the AS of the UE may perform the barring check on a new access attempt on the basis of access barring configuration information for the access identifier configured in the UE and may perform the barring check on the basis of access barring configuration information for the access category. For example, the AS of the UE may override, reject, or skip barring check through the access barring configuration information for the access category by performing the barring check using the access barring configuration information for the access identifier.

The network may broadcast barring configuration information (a barring parameter list) associated with one access identifier and/or barring configuration information (a barring parameter list) associated with one access category through system information. The UE may determine whether to allow a specific access attempt on the basis of the configuration of the UE and the barring parameters received through the broadcast barring configuration information.

The base station broadcasts the barring configuration information through the system information.

For example, the base station broadcasts barring configuration information including information for indicating whether the barring is applied to the access identifier for the UE configured for delay-insensitive service.

For another example, when the UE configured for delay-insensitive service includes a specific access identifier, the base station broadcasts barring configuration information including information for indicating allowance of access to one access attempt, allowance of a barred access attempt, allowance of an access attempt, overriding of access barring, skipping of access control, or provision of a delay-insensitive service and another priority (or service).

For example, the barring configuration information regarding an access category for the UE configured for delay-insensitive service (or any access category) may include one or more pieces of the following information.
- 1-bit indication information for indicating whether the barring is applied to the access identifier configured for delay-insensitive service
- Access barring factor information (ac-BarringFactor): if a random number drawn by the UE is smaller than this value, the access is allowed. Otherwise, the access is barred (or if a random number drawn by the UE is greater than this value, the access is allowed; otherwise, the access is barred.).

Access barring time information (ac-BarringTime)

Information for indicating access identifier information or a detailed type, classification, or category of an access identifier to be applied to the UE configured for delay-insensitive service a) Access identifiers that are configured for delay-insensitive service (or all UEs having access identifiers configured for delay-insensitive service)

b) Access identifiers that are configured for delay-insensitive service and are neither in their home PLMN (HPLMN) nor its equivalent PLMN c) Access identifiers that are configured for delay-insensitive service and are neither in the PLMN listed as most preferred PLMN of the country where the UE is roaming in the operator-defined PLMN selector list on the SIM/USIM, nor in their HPLMN, nor in its equivalent PLMN (or access identifiers that are configured for delay-insensitive service and are in the PLMN listed as most preferred PLMN of the country where the UE is roaming in the operator-defined PLMN selector list on the SIM/USIM)

For another example, the barring configuration information regarding an access identifier for instructing the UE configured for delay-insensitive service to perform the above-described access operation (or any access identifier) may include one or more pieces of the following information.

1-bit indication information for indicating whether the barring is applied to the access identifier Access barring factor information for a corresponding access identifier (ac-BarringFactor): if a random number drawn by the UE is smaller than this value, the access is allowed. Otherwise, the access is barred (or if a random number drawn by the UE is greater than this value, the access is allowed; otherwise, the access is barred.).

Access barring time information for a corresponding access identifier (ac-BarringTime)

Information for indicating access identifier information or a detailed type, classification, or category of the access identifier a) Access identifiers that are configured for delay-insensitive service (or all UEs having access identifiers configured for delay-insensitive service)

b) Access identifiers that are configured for delay-insensitive service and are neither in their HPLMN nor its equivalent PLMN c) Access identifiers that are configured for delay-insensitive service and are neither in the PLMN listed as most preferred PLMN of the country where the UE is roaming in the operator-defined PLMN selector list on the SIM/USIM, nor in their HPLMN nor its equivalent PLMN (or access identifiers that are configured for delay-insensitive service and are in the PLMN listed as most preferred PLMN of the country where the UE is roaming in the operator-defined PLMN selector list on the SIM/USIM)

1-bit indication information for indicating allowance of access in response to an access attempt of the UE having the corresponding access identifier, allowance of an access attempt on which access control is performed (or which access is barred), overriding of the access attempt allowance or the access barring, skipping of the access control, or access control/barring prohibition/allowance for a UE capable of providing both delay-insensitive service and another priority (or service)

For another example, when access is triggered by the UE having the access identifier configured for delay-insensitive service, the AS of the UE performs the barring check on the basis of the received system information.

For example, when the access identifier of the UE has a specific value, and a bit indicating barring of a corresponding access identifier included in the system information is set to 1, the UE considers the cell as being barred. Otherwise, the UE considers the cell as not being barred.

For another example, when PLMN-associated information is included, an entry is selected from PLMN-associated information corresponding to a PLMN selected by an upper layer. If the system information includes information regarding the PLMN and access is triggered by the UE having the access identifier configured for delay-insensitive service, the AS of the UE performs the barring check on the basis of the received system information.

For another example, when the access identifier of the UE has a specific value and a bit indicating barring of a corresponding access identifier included in the system information is set to 1, the UE considers the cell as being barred.

For another example, when the UE configured for delay-insensitive service has the above-described specific access identifier and access is triggered by the UE, the AS of the UE performs the barring check on the basis of the received system information.

For example, the UE considers the cell as not being barred when the access identifier of the corresponding UE has a specific value, and when a bit indicating i) allowance of access in response to an access attempt with respect to a corresponding access identifier included in the system information, ii) allowance of an access attempt on which access control is performed (or which access is barred), iii) overriding of the access attempt allowance or the access barring, iv) skipping of the access control, or v) access control/barring prohibition/allowance for a UE capable of providing both delay-insensitive service and another priority (or service) is set to 1. Otherwise, the UE considers the cell as not being barred. Alternatively, the UE performs access control or barring according to a UE access category.

For another example, when PLMN-associated information is included, an entry is selected from PLMN-associated information corresponding to a PLMN selected by an upper layer. When the system information includes information regarding the PLMN and access is triggered by the UE having the specific access identifier, the AS of the UE performs the barring check on the basis of the received system information.

For example, the UE considers the cell as not being barred when the access identifier of the corresponding UE has a specific value, when a bit indicating i) allowance of access in response to an access attempt with respect to a corresponding access identifier included in the system information, ii) allowance of an access attempt on which access control is performed (or which access is barred), iii) overriding of the access attempt allowance or the access barring, iv) skipping of the access control, or v) access control/barring prohibition/allowance for a UE capable of providing both delay-insensitive service and another priority (or service) is set to 1.

For another example, when access is triggered by the UE having the access identifier configured for delay-insensitive service, the AS of the UE performs the barring check on the basis of the received system information.

For example, the UE considers the cell as not being barred when the access identifier of the corresponding UE has a specific value, and when a bit indicating i) allowance of access in response to an access attempt with respect to a corresponding access identifier included in the system information, ii) allowance of an access attempt on which access control is performed (or which access is barred), iii) overriding of the access attempt allowance or the access barring, iv) skipping of the access control, or v) access control/barring prohibition/allowance for a UE capable of providing both delay-insensitive service and another priority (or service) is set to 1. Otherwise, the UE considers the cell as being barred.

Method of Performing an Access Control/Prohibition Processing Operation in Association with a Specific Access Category in Consideration of Detailed Information of the UE Configured for Delay-Insensitive Service Different criteria such as an operator policy, a deployment scenario, a subscriber profile, and an available service are used to determine whether an access attempt is allowed or blocked when congestion occurs within a 5G system. The different criteria for the access control may be associated with an access category. The 5G system may provide single unified access control that is performed by an operator to control access on the basis of the access category.

First, a method of processing the UE configured for delay-insensitive service in association with a specific access category will be described.

Configuration information for delay-insensitive service and/or detailed configuration information of the corresponding UE may be configured, included, or stored in the UE. The network may broadcast barring configuration information (a barring parameter list and a barring parameter list corresponding to detailed information) associated with one access identifier through system information. The UE may determine whether to allow a specific access attempt on the basis of the configuration of the UE and the barring parameters received through the broadcast barring configuration information.

For another example, the above-described detailed configuration information may be information for identifying a standardized specific access attempt (e.g., an access attempt through one of MO signaling caused from paging, emergency, MO signaling caused from factors other than paging, MMTEL voice/video, SMS, and MO data). For example, the UE may be configured for delay-insensitive service through NAS signaling. The network (e.g., a core network entity, a core network control plane entity, an AMF, and the like) may instruct the UE to be configured for delay-insensitive service (on the basis of subscription information) when the UE performs one or more of a registration procedure (e.g., attach procedure), a PDU session establishment procedure, a tracking region update procedure, and a service request procedure. The UE may configure, store, or set the indication information in UE context/NAS context/NAS device property information/UE-specific device property information.

For another example, detailed information of the UE configured for delay-insensitive service may be configured through NAS signaling. When the UE performs one or more of a registration (attach) procedure, a PDU session establishment procedure, a tracking region update procedure, and a service request procedure, the network (e.g., a core network entity, a core network control plane entity, an AMF, and the like) may instruct the UE to be configured with the detailed information (on the basis of subscription information). The UE may configure, store, or set the detailed indication information in the UE context/NAS context/NAS device property information/UE-specific device property information.

For another example, the UE may be configured, stored, or set as a specific access category for delay-insensitive service on the USIM.

For another example, the detailed information of the UE configured for delay-insensitive service may be configured, stored, or set on the USIM.

The base station broadcasts the barring configuration information through the system information.

For example, the base station broadcasts barring configuration information including information for indicating whether the barring is applied to the access category for the UE configured for delay-insensitive service.

The barring configuration information regarding an access category for the UE configured for delay-insensitive service (or barring configuration information for performing barring when the UE configured for delay-insensitive service makes an access attempt) may include one or more pieces of the following information.

1-bit indication information for indicating whether the barring is applied to the UE configured for delay-insensitive service (or the UE configured for delay-insensitive service).

Access barring factor information (ac-BarringFactor): if a random number drawn by the UE is smaller than this value, the access is allowed. Otherwise, the access is barred (or if a random number drawn by the UE is greater than this value, the access is allowed; otherwise, the access is barred.).

Access barring time information (ac-BarringTime)

Information for indicating a detailed type, classification, or category of the UE configured for delay-insensitive service (to which access control is to be applied)

a) UEs configured for delay-insensitive service (or all UEs configured for delay-insensitive service)

b) UEs that are configured for delay tolerant service and are neither in their HPLMN nor in a PLMN that is equivalent to it c) UEs that are configured for delay tolerant service and are neither in the PLMN listed as most preferred PLMN of the country where the UE is roaming in the operator-defined PLMN selector list on the SIM/USIM, nor in their HPLMN, nor in a PLMN that is equivalent to their HPLMN (or UEs that are configured for delay tolerant service, and are in the PLMN listed as most preferred PLMN of the country where the UE is roaming in the operator-defined PLMN selector list on the SIM/USIM)

Indication information for indicating whether the barring is applied to a specific sub-group/class/access class/classification/distribution group of the UE configured for delay-insensitive service (to which access control is to be applied).

For example, this may indicate whether the barring is applied to AC 0-9 by using a bitmap. The first/leftmost bit is for AC 0, the second bit is for AC 1, and so on.

For another example, this may indicate whether the barring is applied to a specific group/class/access class/classification/distribution group of the UE configured, stored, or set on the USIM. The first/leftmost bit is for the first group/class/access class/classification/distribution group, the second bit is for the second group/class/access class/classification/distribution group, and so on.

For another example, this may indicate barring bitmap configuration information for each standardized specific access attempt (e.g., an access attempt through one of MO signaling caused from paging, emergency, MO signaling caused from factors other than paging, MMTEL voice/video, SMS, and MO data).

For another example, when access is triggered by the UE configured for delay-insensitive service, the NAS of the UE delivers a corresponding category (e.g., access category #1: an access category in which the UE configured for delay-insensitive service is applied to an access attempt other than an emergency access attempt) to the AS (e.g., RRC) of the UE.

The AS of the UE performs the barring check on the basis of the received system information (or barring configuration information for the corresponding access category).

For example, if information regarding a specific sub-group/class/access class/classification/distribution group of the UE is stored on the USIM (or configured or stored in the UE through NAS signaling) and has a value in a specific range, the UE considers the cell as being barred when a bit corresponding to the bitmap included in the system information is set to 1. When the bit corresponding to the bitmap included in the system information is not set to 1, the UE considers the cell as not being barred.

For another example, when PLMN-associated information is included, an entry is selected from PLMN-associated information corresponding to a PLMN selected by an upper layer.

If the system information includes the information regarding the PLMN, the UE is included in a type/classification/category indicated by information for indicating a detailed type/classification/category of the UE configured for delay-insensitive service, and the information regarding a specific group/class/access class/distribution group/classification/access identifier of the UE is stored on the USIM (or configured or stored in the UE through NAS signaling) and has a value in a specific range, the UE considers the cell as being barred when the bit corresponding to the bitmap included in the system information is set to 1. Otherwise, the UE considers the cell as not being barred.

FIG. 7 is a diagram illustrating a mapping table in which an access category is mapped to an access attempt according to still another embodiment.

Referring to FIG. 7, access categories may have numbers #0 to #63. The access categories may be classified in consideration of an access attempt type and a UE-associated condition and may be classified as an access category designated based on a standardized access category and an operator classification.

For example, when a UE which is in the RRC idle state or in the RRC inactive state establishes an RRC connection, the NAS of the UE may provide access category information to the RRC (AS) of the UE. Optionally or additionally, the NAS of the UE may provide additional information for determining an RRC connection establishment cause to the RRC of the UE in addition to the access category information.

For another example, when a UE which is in the RRC connected state establishes an RRC connection through NAS signaling in order to establish a new PDU session, the NAS of the UE may provide access category information to the RRC (AS) of the UE. Optionally or additionally, the NAS of the UE may provide additional information for determining an RRC connection establishment cause to the RRC of the UE in addition to the access category information.

Method of Processing a UE Configured for Delay-Insensitive Service in Association with a Specific Access Identifier Different criteria such as an operator policy, a deployment scenario, a subscriber profile, and an available service are used to determine whether an access attempt is allowed or blocked when congestion occurs within a 5G system. The different criteria for the access control may be processed in association with an access identifier configured/established/set in the UE. The 5G system provides single unified access control in which an operator controls access on the basis of the access identifier.

A method of processing the UE configured for delay-insensitive service in association with a specific access identifier will be described below.

As described, the access identifier may be configured in the UE.

For example, the access identifier may indicate configuration information for indicating access control in response to one access attempt, allowance of the barred access attempt, overriding of the access attempt allowance/access barring, skipping of the access control, or provision of both delay-insensitive service and another priority (or service) when the configuration information is not configured with the access identifier. The access identifier is used to perform access control on one access attempt according to subscription information, allow the barred access attempt, override the access attempt allowance/access barring, skip the access control, and provide both the delay-insensitive service and another priority (or service). The access identifier is used to perform access control by an access category corresponding to one access attempt according to subscription information, allow the barred access attempt, override the access attempt allowance/access barring, skip the access control, and provide both the delay-insensitive service and another priority (or service).

For another example, the access identifier may indicate information for indicating access control/barring for one access attempt when the information is configured with the access identifier. The access identifier is used to indicate access control/barring for one access attempt according to the subscription information. The access identifier is used to provide access control/barring for one access attempt according to the subscription information, irrespective of an access category corresponding to the access attempt.

The network may broadcast barring configuration information (e.g., a barring parameter list) associated with one access identifier through system information. The UE may determine whether to allow a specific access attempt based on the configuration of the UE and the barring parameters received through the broadcast barring configuration information.

For example, the UE may be configured for delay-insensitive service through NAS signaling. When the UE performs one or more of a registration (e.g., attach) procedure, a PDU session establishment procedure, a tracking region update procedure, and a service request procedure, the network (e.g., a core network entity, a core network control plane entity, an AMF, and the like) may instruct the UE to be configured for delay-insensitive service (on the basis of subscription information). The UE may configure, store, or set, as an access identifier, the indication information in UE-specific access identifier information/UE context/NAS context/NAS device property information/UE-specific device property information.

For another example, the UE may be configured with an access identifier for delay-insensitive service through NAS signaling (or the UE may be configured with a specific access identifier for delay-insensitive service through NAS signaling). When the UE performs one or more of a registration (e.g., attach) procedure, a PDU session establishment procedure, a tracking region update procedure, and a service request procedure, the network (e.g., a core network entity, a core network control plane entity, an AMF, and the like) may instruct the UE to be configured with a specific access identifier for delay-insensitive service (on the basis of subscription information). The UE may configure, store, or set, as an access identifier, the indication information in UE-specific access identifier information/UE context/NAS context/NAS device property information/UE-specific device property information.

For another example, the UE may be configured with an access identifier for allowing one access attempt for the UE for delay-insensitive service through NAS signaling, allowing an access attempt on which access control is performed or (which is barred), overriding access allowance/access barring, skipping the access control, or providing both of the delay-insensitive service and another priority (or service). Alternatively, even the UE configured for delay-insensitive service may be configured with a specific access identifier for overriding this through NAS signaling. When the UE performs one or more of a registration (e.g., attach) procedure, a PDU session establishment procedure, a tracking region update procedure, and a service request procedure, the network (e.g., a core network entity, a core network control plane entity, an AMF, and the like) may instruct the UE to be configured with the access identifier (on the basis of subscription information). The UE may configure, store, or set, as an access identifier, the indication information in UE-specific access identifier information/UE context/NAS context/NAS device property information/UE-specific device property information.

For another example, the UE may be configured, stored, or set with a specific value in the access identifier information for delay-insensitive service on the USIM.

For another example, the UE may be configured, stored, or set with a specific value in the access identifier information on the USIM.

The base station broadcasts the barring configuration information through the system information.

For example, the base station broadcasts barring configuration information including information for indicating whether the barring is applied to the access identifier for the UE configured for delay-insensitive service.

For another example, when the UE configured for delay-insensitive service is configured with a specific access identifier, the base station broadcasts barring configuration information including information for indicating allowance of an access attempt on which access control is performed or which access is barred in response to the access attempt, overriding of access attempt allowance/access barring, skipping of the access control, or provision of both the delay-insensitive service and another priority (or service).

For example, the barring configuration information regarding an access category for the UE configured for delay-insensitive service may include one or more pieces of the following information.

- 1-bit indication information for indicating whether the barring is applied to the access identifier configured for delay-insensitive service
- Access barring factor information (ac-BarringFactor): if a random number drawn by the UE is smaller than this value, the access is allowed. Otherwise, the access is barred (or if a random number drawn by the UE is greater than this value, the access is allowed; otherwise, the access is barred.).
- Access barring time information (ac-BarringTime)
- Information for indicating access identifier information or a detailed type, classification, or category of an access identifier to be applied to the UE configured for delay-insensitive service
    a) Access identifiers that are configured for delay-insensitive service (or all UEs having access identifiers configured for delay-insensitive service)
    b) Access identifiers that are configured for delay-insensitive service and are neither in their HPLMN nor its equivalent PLMN
    c) Access identifiers that are configured for delay-insensitive service and are neither in the PLMN listed as most preferred PLMN of the country where the UE is roaming in the operator-defined PLMN selector list on the SIM/USIM, nor in their HPLMN, nor its equivalent PLMN (or access identifiers that are configured for delay-insensitive service and are in the PLMN listed as most preferred PLMN of the country where the UE is roaming in the operator-defined PLMN selector list on the SIM/USIM)

For another example, the barring configuration information regarding an access identifier for instructing the UE configured for delay-insensitive service to perform the above-described access operation may include one or more pieces of the following information.

- 1-bit indication information for indicating whether the barring is applied to the access identifier
- Access barring factor information for a corresponding access identifier (ac-BarringFactor): if a random number drawn by the UE is smaller than this value, the access is allowed. Otherwise, the access is barred (or if a random number drawn by the UE is greater than this value, the access is allowed; otherwise, the access is barred.).
- Access barring time information for a corresponding access identifier (ac-BarringTime)
- Information for indicating access identifier information or a detailed type, classification, or category of the access identifier
    a) Access identifiers that are configured for delay-insensitive service (or all UEs having access identifiers configured for delay-insensitive service)
    b) Access identifiers that are configured for delay-insensitive service and are neither in their HPLMN nor its equivalent PLMN
    c) Access identifiers that are configured for delay-insensitive service and are neither in the PLMN listed as most preferred PLMN of the country where the UE is roaming in the operator-defined PLMN selector list on the SIM/USIM, nor in their HPLMN, nor its equivalent PLMN (or access identifiers that are configured for delay-insensitive service and are in the PLMN listed as most preferred PLMN of the country where the UE is roaming in the operator-defined PLMN selector list on the SIM/USIM)
- 1-bit indication information for indicating allowance of access in response to an access attempt of the UE having the corresponding access identifier, allowance of an access attempt on which access control is performed (or which access is barred), overriding of the access attempt allowance or the access barring, skipping of the access control, or access control/barring prohibition/allowance for a UE capable of providing both delay-insensitive service and another priority (or service)

For another example, when access is triggered by the UE having the access identifier configured for delay-insensitive service, the AS of the UE performs the barring check on the basis of the received system information.

For example, when the access identifier of the UE has a specific value and a bit indicating barring of a corresponding access identifier included in the system information is set to 1, the UE considers the cell as being barred. Otherwise, the UE considers the cell as not being barred.

For another example, when PLMN-associated information is included, an entry is selected from PLMN-associated information corresponding to a PLMN selected by an upper layer.

If the system information includes information indicating that the PLMN and access is triggered by the UE having the access identifier configured for delay-insensitive service, the AS of the UE performs the barring check on the basis of the received system information.

For another example, when the access identifier of the UE has a specific value and when a bit indicating barring of a corresponding access identifier included in the system information is set to 1, the UE considers the cell as being barred.

For another example, when the UE configured for delay-insensitive service has the above-described specific access identifier and when access is triggered by the UE, the AS of the UE performs the barring check on the basis of the received system information.

For example, when the access identifier of the corresponding UE has a specific value and when one of i) a bit indicating allowance of access in response to an access attempt with respect to a corresponding access identifier included in the system information ii) a bit indicating allowance of an access attempt on which access control is performed (or which access is barred), overriding of the access attempt allowance or the access barring, iii) a bit indicating skipping of the access control, and iv) a bit indicating access control/barring prohibition/allowance for a UE capable of providing both delay-insensitive service and another priority (or service) is set to 1, the UE considers the cell as not being barred. Otherwise, the UE considers the cell as not being barred. Alternatively, the UE performs access control or barring according to a UE access category.

For another example, when PLMN-associated information is included, an entry is selected from PLMN-associated information corresponding to a PLMN selected by an upper layer.

When the system information includes information indicating that the PLMN and access is triggered by the UE having the specific access identifier, the AS of the UE performs the barring check on the basis of the received system information.

For example, when the access identifier of the corresponding UE has a specific value and when one of i) a bit indicating allowance of access in response to an access attempt with respect to a corresponding access identifier included in the system information, ii) a bit indicating allowance of an access attempt on which access control is performed (or which access is barred), overriding of the access attempt allowance or the access barring, iii) a bit indicating skipping of the access control, and iv) a bit indicating access control/barring prohibition/allowance for a UE capable of providing both delay-insensitive service and another priority (or service) is set to 1, the UE considers the cell as not being barred.

Method of Access Control Classified According to a Combination of an Access Category for the UE for Delay-Insensitive Service and a Specific Access Identifier Configured in the UE Different criteria such as an operator policy, a deployment scenario, a subscriber profile, and an available service are used to determine whether an access attempt is allowed or blocked when congestion occurs within a 5G system. The different criteria for the access control may be associated with an access identifier and an access category. The 5G system provides single unified access control in which an operator controls access in terms of the above two aspects.

The configuration information for delay-insensitive service may be configured in the UE. When the UE configured for delay-inactive service makes an access attempt (other than an emergency access attempt), the NAS of the US may transfer specific access category information to the AS of the UE.

For example, the access identifier may indicate configuration information for indicating i) allowance of an access attempt on which access control is performed or which access is barred; ii) overriding of access attempt allowance or access barring; skipping of the access control; or iii) provision of both delay-insensitive service and another priority (or service) when the configuration information is not configured with the access identifier. The access identifier is used to i) allow an access attempt on which access control is performed or which access is barred, ii) override the access attempt allowance or access barring; skip the access control; or iii) provide both delay-insensitive service and another priority (or service) according to subscription information. The access identifier is used to i) allow an access attempt on which access control is performed or which access is barred by an access category corresponding to the access attempt, ii) override the access attempt allowance or access barring; iii) skip the access control; or iv) provide both delay-insensitive service and another priority (or service) according to subscription information.

For another example, the access identifier may indicate information for indicating access control/barring for one access attempt when the information is configured with the access identifier. The access identifier is used to indicate access control/barring for one access attempt according to the subscription information. The access identifier is used to provide access control/barring/access attempt allowance/preferential access control processing for the access attempt, according to the subscription information, irrespective of an access category corresponding to the access attempt.

For example, the UE may be configured for delay-insensitive service through NAS signaling. When the UE performs one or more of a registration (attach) procedure, a PDU session establishment procedure, a tracking region update procedure, and a service request procedure, the network (e.g., a core network entity, a core network control plane entity, an AMF, and the like) may instruct the UE to be configured for delay-insensitive service (on the basis of subscription information). The network may configure the UE in association with one or more of the access identification information and the UE access category in order to configure the UE for delay-insensitive service.

The UE may configure, store, or set the indication information in UE-specific access identifier information/UE context/NAS context/NAS device property information/UE-specific device property information.

For another example, for delay-insensitive service on the USIM, the UE may have a specific value configured, stored, or set in the UE access identifier information and/or the UE access category information.

The UE access category or the access identifier information configured in the UE for delay-insensitive service may be configured with different detailed configuration information. Alternatively, the UE access category (or the access identifier information) configured in the UE for delay-insensitive service may be configured with the same detailed configuration information.

The base station broadcasts the barring configuration information through the system information.

For example, when the UE configured for delay-insensitive service makes a normal/general access, the base station broadcasts barring configuration information including information for indicating whether the barring is applied to the access category and/or the access identifier corresponding to the access attempt of the UE.

When the UE configured for delay-insensitive service makes a normal/general access, i) barring configuration information for indicating whether the barring is applied to the access category and/or the access identifier corresponding to the access attempt of the UE or ii) barring configuration information for the access category and/or the access identifier for the UE configured for the delay-insensitive service may include one or more pieces of the following information.

1-bit indication information for indicating whether the barring is applied to a UE having a specific access identifier value among UEs configured for delay-insensitive service For convenience of description, the UE configured for delay-insensitive service will be described as having one of five access identifiers. This is merely for convenience of description, the scope of the present disclosure covers the UE having one of any number of access identifiers (here, the number is less or equal to ten), such as the UE having one of two access identifiers, the UE having one of three access identifiers, . . . , and the UE having one of ten access identifiers.

For example, it is assumed that five access identifiers have consecutive access identifiers #6 to #10 for convenience of description. This is merely for convenience of description. When any consecutive five access identifiers such as #1 to #5, #2 to #6, #3 to #7, or the like are used, a bitmap may be used to indicate whether the barring is applied to the five access identifiers. The first/leftmost bit is for access identifier #6, the second bit is for access identifier #7, and so on.

For another example, a bitmap may be used to indicate whether the barring is applied to an access identifier mapped to a specific number of a UE configured, stored, or set on the USIM or allocated by a network. The first/leftmost bit is for access identifier #6, the second bit is for access identifier #7, and so on. The UE may have an access identifier mapped to the number of the UE. The UE may have one of the five access identifiers and may be set to one of access identifiers #6 to #10. For example, an access identifier may be obtained through modular operation as one of 1) Mobile Station International ISDN Number (MSISDN), 2) International Mobile Station Identity (IMSI), 3) International Mobile Equipment Identity (IMEI), 4) Temporary Mobile Subscriber Identity (TMSI) (for convenience of description, TMSI will be described as an example, but the scope of the present disclosure covers any number allocated by a core network.), and 5) C-RNTI (for convenience of description, C-RNTI will be described as an example, but the scope of the present disclosure covers any number allocated by the base station.) of the UE. By using an expression "access identifier=5+UE number mod 5," any UE may be set as one of access identifiers #6 to #10 on the basis of MSISDN, IMSI, IMEI, TMSI, and C-RNTI of the UE.

Access barring factor information (ac-BarringFactor): if a random number drawn by the UE is smaller than this value, the access is allowed. Otherwise, the access is barred (or if a random number drawn by the UE is greater than this value, the access is allowed; otherwise, the access is barred.).

Access barring time information (ac-BarringTime)

Information for indicating a detailed type, classification, or category of the UE configured for delay-insensitive service a) UEs configured for delay-insensitive service (or all UEs configured for delay-insensitive service)

b) UEs that are configured for delay tolerant service and are neither in their HPLMN nor in a PLMN that is equivalent to it c) UEs that are configured for delay tolerant service and are neither in the PLMN listed as most preferred PLMN of the country where the UE is roaming in the operator-defined PLMN selector list on the SIM/USIM, nor in their HPLMN, nor in a PLMN that is equivalent to their HPLMN (or UEs that are configured for delay tolerant service and are in the PLMN listed as most preferred PLMN of the country where the UE is roaming in the operator-defined PLMN selector list on the SIM/USIM)

1-bit indication information for indicating barring skip, preferential processing/not barred/access allowance/access attempt allowance/override/access barring override for a UE having a specific access identifier among UEs configured for delay-insensitive service For convenience of description, it is assumed that the UE configured for delay-insensitive service is configured for mission critical service such as multimedia priority service and public disaster service. This is merely for convenience of description, and the scope of the present invention covers a UE configured in another one service or a plurality of services. For example, the scope of the present disclosure also covers a UE configured to provide any service such as an emergency communication service, a specific application service, and the like.

For example, it is assumed that access identifier #2 is defined as a mission critical service. This is for convenience of description, and the scope of the present disclosure covers defining and processing one or more services with access identifiers or defining and processing any service with a specific access identifier.

It is assumed that the barring being applied to access identifier #2 is set to 0 and barring skip/preferential processing/not barred/access allowance/access attempt allowance/override/access barring override is set to 1.

When access is triggered by the UE configured for delay-insensitive service, the UE may have access identifier #2 (or access identifier #2 may be configured, indicated, or set), and a corresponding bit in the system information may be set to 1. In this case, barring skip/preferential processing/not barred/access allowance/access attempt allowance/override/access barring override may be performed on the UE.

On the other hand, when the corresponding bit in the system information is set to 0, access barring may be performed on the UE. For example, when access is triggered by the UE configured for delay-insensitive service, access barring may be performed by a corresponding access category.

For another example, it is assumed that access identifier #1 is defined as a multimedia priority service. This is for convenience of description, and the scope of the present disclosure covers defining and processing one or more services with access identifiers or defining and processing any service with a specific access identifier.

It is assumed that the barring being applied to access identifier #1 is set to 0 and barring skip/preferential processing/not barred/access allowance/access attempt allowance/override/access barring override is set to 1.

When access is triggered by the UE configured for delay-insensitive service, the UE may have access identifier #1 (or access identifier #1 may be configured, indicated, or set), and also a corresponding bit in the system information may be set to 1. In this case, barring skip/preferential processing/not barred/access allowance/access attempt allowance/override/access barring override may be performed on the UE. For example, access barring skip/access allowance/access attempt allowance/override/access barring override may be performed on access category #1.

On the other hand, when the corresponding bit in the system information is set to 0, access barring may be performed on the UE. For example, when access is triggered by the UE configured for delay-insensitive service, access barring may be performed by a corresponding access category.

For another example, it is assumed that access identifier #1 is defined as a multimedia priority service. This is for convenience of description, and the scope of the present disclosure covers defining and processing one or more services with access identifiers or defining and processing any service with a specific access identifier.

When access is triggered by the UE configured for delay-insensitive service, the UE may have access identifier #1 (or the UE may be configured/indicated/set with access identifier #1 or access may be triggered for a corresponding service by the UE). In this case, the UE (or the NAS of the UE) may deliver, to the AS (e.g., RRC) of the UE, an access category value different from an access category value (access category #2 in FIG. 7) that indicates the access category for the access attempt when access is triggered by the UE configured for delay-insensitive service. For example, the UE may deliver one of MO signaling caused by factors other than paging such as access category #3 or MO data not belonging to another access category such as access category #7, any access category for operator identification, and any standardized access category.

The AC of the UE performs the barring check on the received access category on the basis of the system information.

As described above, according to the present embodiment, it is possible to efficiently perform access control of a UE configured with a specific service or function such as delay-insensitive service on the basis of unified access control. Also, it is possible to apply an access control operation of a UE configured with a specific service such as delay-insensitive service in combination with the above-described unified access control operation.

The following description of the UE capable of performing the above embodiments of the present disclosure focuses on the embodiment that has been described with reference to FIG. 1. However, the following UE may perform the other embodiments in addition to that of FIG. 1.

Figure 8:
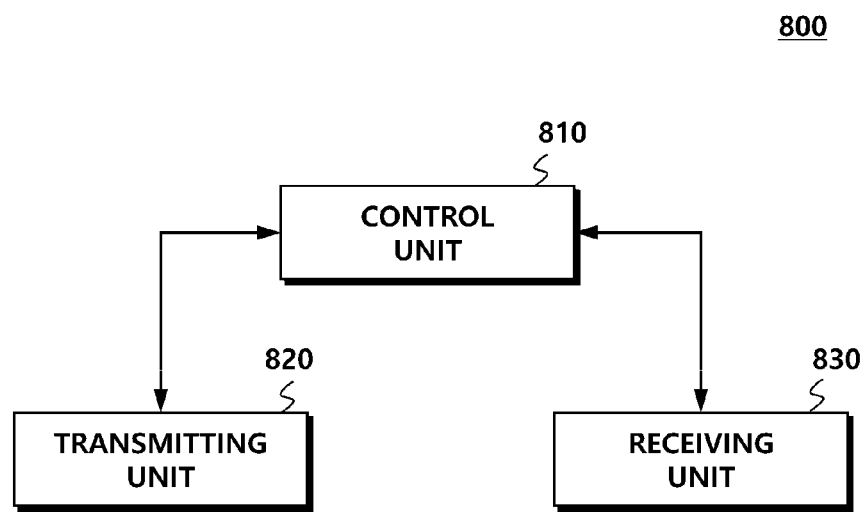
FIG. 8 is a block diagram illustrating a UE according to an embodiment.

FIG. 8 is a block diagram illustrating a UE according to an embodiment.

Referring to FIG. 8, a UE 800 may be configured to perform an access control operation. Such a UE 800 may include a receiving unit 830 configured to receive operator-defined access category information through NAS signaling and a control unit 810 configured to, when an access attempt of the UE 800 is triggered, determine one access category for the access attempt in an NAS layer or an access stratum (AS) layer, select RRC establishment cause information associated with the access category, and perform an access barring check operation in the AS layer using access barring parameters associated with the access category.

For example, the UE 800 may perform the access control operation using a reference access category and operator-defined access category information. The reference access category is predetermined or received from the base station, and the operator-defined access category information is received from a base station through the NAS signaling.

For example, the reference access category may be configured as a mapping table in which an access category is determined to be mapped to the type of access attempt of the UE.

For another example, the operator-defined access category may include at least one of an access category number, a 5QI, an application identifier for triggering an access attempt, and specific PDU session information associated with a slice.

The control unit 810 may store the operator-defined access category information in the UE 800 and detect whether the access attempt of the UE 800 is triggered. The access attempt may be made by the UE to establish an RRC connection to the base station. Alternatively, the access attempt may be made by the UE to communicate with the base station.

For example, when the UE 800 transitions from the RRC idle state to the RRC connected state or when the UE 800 initiates a PDU session during the RRC connected state, the control unit 810 may determine that the access attempt of the UE 800 is triggered.

For another example, when it is required to transmit an emergency signal or when it is triggered to perform a response to a paging signal, an access attempt for a low-latency service, or a terminal origination of voice data, the control unit 810 may determine that the access attempt is triggered.

When the access attempt is triggered, the control unit 810 may select any one access category from among the access category information stored or configured in the UE. For example, the access category selected by the control unit 810 refers to category information selected from a set of access categories including the reference access category and the operator-defined access category information.

As described, the control unit 810 may select an access category set for each access attempt. For example, the UE may check a rule in an order of rule numbers of a mapping table in which one or more access categories are designated for each access attempt and may determine an access category indicated by an access attempt. To this end, the UE uses a mapping table in which an access attempt is mapped to an access category.

The mapping table may be configured such that a rule number (Rule #) is mapped to the type of access attempt and an access category. Also, the mapping table may be configured using either the above-described reference access category or the operator-defined access category. Alternatively, the mapping table may be configured using both the reference access category and the operator-defined access category.

Accordingly, the control unit 810 may check an access attempt according to a rule number using the configured mapping table. When a triggered access attempt is present, the UE may select an access category mapped to the access attempt.

When a result of checking the rule according to the mapping table is that two or more access categories are mapped to the access attempt, the control unit 810 may determine an access category having the smallest rule number. For example, although an access attempt for a delay tolerant service (a service with low delay sensitivity) is triggered, a corresponding detailed access attempt may be included in the operator-defined access category. That is, the access attempt may be mapped to both the reference access category and the operator-defined access category. In this case, since a rule number associated with the operator-defined access category is #3 and a rule number for the delay tolerant service is #4, the UE 800 may select the operator-defined access category #3 having a relatively small rule number.

Alternatively, when an access attempt matches the triggered access attempt, the control unit 810 may stop checking the rule numbers and select an access category mapped to the corresponding access attempt by checking the access attempts, starting from the low rule number of the mapping table.

To this end, the rule numbers of the mapping table may be set to check a specific access attempt, starting from a low number. For example, the rule number of the access attempt mapped to the operator-defined access category may be set to be smaller than the rule number of the access attempt for the delay tolerant service.

The control unit 810 may select the access category corresponding to the access attempt using the mapping table and may select RRC establishment cause information associated with the selected access category. The control unit 810 selects an access category associated with an access attempt from among one or more reference access categories and selects an RRC establishment cause mapped to the selected access category. The access category and the RRC establishment cause may be associated with each other through a separate mapping table. That is, the access category and the RRC establishment cause may be mapped to each other on a one-to-one basis.

The control unit 810 may perform the access barring check operation using access barring parameters stored in association with the selected access category. The access barring parameters may be received from the base station or pre-stored in the UE. The access barring parameters may have different values that are set for each access category. Accordingly, the control unit 810 confirms the access barring parameters configured in association with the determined access category and applies the corresponding parameters to perform the access barring check operation.

In addition, in the method of performing access control in a next-generation mobile communication network needed to carry out the present disclosure, the control unit 810 controls the overall operation of the UE 800 when performing the unified access control operation using an operator-defined access category and a reference access category and also performing the unified access control operation in consideration of delay-insensitive service.

Also, a transmitting unit 820 and the receiving unit 830 are used to transmit and receive signals, messages, or data needed to implement the above-described embodiments to and from other base stations or other UEs.

By providing a unified access control operation in a next-generation mobile communication technology according to the embodiments of the present disclosure, it is possible to reduce implementation complexity of a UE, decrease unnecessary signaling, and prevent waste of radio resources.

Also, in accordance with the embodiment of the present disclosure, it is possible to increase flexibility and efficiency by utilizing a delay-insensitive service and an access category that is individually defined by an operator.

The terms "system," "processor," "controller," "component," "module," "interface," "model," "unit," and the like may generally refer to a computer-related entity such as hardware, software or software which is running, or a combination of hardware and software. For example, the above-described components may be, but are not limited to, a process driven by a processor, a processor, a controller, a control processor, an entity, an execution thread, a program, and/or a computer. For example, all of a controller or processor and an application running on the controller or processor may be elements. One or more elements may reside within a process and/or an execution thread and may be located in one system or distributed to two or more systems.

Specifications and standards mentioned in the foregoing embodiments have been omitted herein to simplify the description of the specification but still constitute part of the present specification. Therefore, it should be understood that part of the specifications and standards can be added to the present specification or be specified in the claims and still be within the scope of the present disclosure.

The above-described subject matter of the present disclosure is to be considered illustrative and not restrictive, and it should be understood that numerous other modifications and embodiments can be devised by those skilled in the art that will fall within the spirit and scope of the principles of the present disclosure. Therefore, the embodiments disclosed herein are intended not to limit but to describe the technical spirit of the present disclosure, and the scope of the present disclosure is not limited to the embodiments. The scope of the disclosure should be construed by the appended claims, and all technical sprits within the scope of their equivalents should be construed as included in the scope of the disclosure.

What is claimed is:

1. A method for performing, by a user equipment (UE) an access control operation, the method comprising:
    receiving operator-defined access category information through non-access stratum (NAS) signaling when an access attempt of the UE is triggered, wherein the operator-defined access category information is set and used by an operator who operates a base station;
    determining one access category for the access attempt in one of an NAS layer and an access stratum (AS) layer;
    selecting Radio Resource Control (RRC) establishment cause information associated with the access category; and
    performing an access barring check operation in the AS layer using access barring parameters associated with the access category,
    wherein the determining of the access category comprises:
        checking a rule in an order of rule numbers of a mapping table in which one or more access categories are designated for each access attempt; and
        determining an access category indicated by the access attempt, and
    wherein for the rule numbers of the mapping table, a rule number of an access attempt mapped to an operator-defined access category is set to be lower than a rule number of an access attempt for a delay tolerant service.

2. The method of claim 1, wherein the one access category is selected from a set of access categories including the operator-defined access category information and a reference access category.

3. The method of claim 1, wherein the operator-defined access category information includes at least one of an access category number, a 5G QoS identifier (5QI), an application identifier for triggering the access attempt, and specific protocol data unit (PDU) session information associated with a slice.

4. The method of claim 1, wherein the determining of the access category comprises determining that the access attempt of the UE is triggered when the UE transitions from an RRC idle state to an RRC connected state or when the UE initiates a PDU session in the RRC connected state.

5. The method of claim 1, wherein the determining of the access category comprises determining an access category with a lowest rule number when a result of the checking of the rule according to the mapping table indicates that two or more access categories are mapped to the access attempt.

6. The method of claim 1, wherein the selecting of the RRC establishment cause information comprises:
selecting an access category associated with the access attempt from among one or more reference access categories; and
selecting an RRC establishment cause mapped to the access category.

7. The method of claim 6, wherein the one or more reference access categories are set in association with an operator-defined access category.

8. A user equipment (UE) for performing an access control operation, the UE comprising:
a receiving unit configured to receive operator-defined access category information through non-access stratum (NAS) signaling, wherein the operator-defined access category information is set and used by an operator who operates a base station; and
a control unit configured to, when an access attempt of the UE is triggered, determine one access category for the access attempt in one of an NAS layer and an access stratum (AS) layer, select Radio Resource Control (RRC) establishment cause information associated with the access category, and perform an access barring check operation in the AS layer using access barring parameters associated with the access category,
wherein the control unit is configured to:
check a rule in an order of rule numbers of a mapping table in which one or more access categories are designated for each access attempt, and
determine an access category indicated by the access attempt, and
wherein for the rule numbers of the mapping table, a rule number of an access attempt mapped to an operator-defined access category is set to be lower than a rule number of an access attempt for a delay tolerant service.

9. The UE of claim 8, wherein the one access category is selected from a set of access categories including the operator-defined access category information and a reference access category.

10. The UE of claim 8, wherein the operator-defined access category information includes at least one of an access category number, a 5G QoS identifier (5QI), an application identifier for triggering the access attempt, and specific protocol data unit (PDU) session information associated with a slice.

11. The UE of claim 8, wherein the control unit determines that the access attempt of the UE is triggered when the UE transitions from an RRC idle state to an RRC connected state or when the UE initiates a PDU session in the RRC connected state.

12. The UE of claim 8, wherein the control unit determines an access category with a lowest rule number when a result of the checking of the rule according to the mapping table indicates that two or more access categories are mapped to the access attempt.

13. The UE of claim 8, wherein the control unit selects an access category associated with the access attempt from among one or more reference access categories and selects an RRC establishment cause mapped to the access category.

14. The UE of claim 13, wherein the one or more reference access categories are set in association with an operator-defined access category.

* * * * *